(12) United States Patent
Hudson et al.

(10) Patent No.: US 11,156,062 B2
(45) Date of Patent: Oct. 26, 2021

(54) MONITORING WELL INSTALLATIONS

(71) Applicant: METROL TECHNOLOGY LTD, Aberdeen (GB)

(72) Inventors: Steven Martin Hudson, Aberdeen (GB); Leslie David Jarvis, Aberdeen (GB); Axel May, Aberdeen (GB)

(73) Assignee: METROL TECHNOLOGY LTD., Aberdeenshire (GB)

( * ) Notice: Subject to any disclaimer, the term of this patent is extended or adjusted under 35 U.S.C. 154(b) by 97 days.

(21) Appl. No.: 16/498,653

(22) PCT Filed: Mar. 31, 2017

(86) PCT No.: PCT/GB2017/050912
§ 371 (c)(1),
(2) Date: Sep. 27, 2019

(87) PCT Pub. No.: WO2018/178607
PCT Pub. Date: Oct. 4, 2018

(65) Prior Publication Data
US 2020/0102820 A1 Apr. 2, 2020

(51) Int. Cl.
*E21B 47/13* (2012.01)
*E21B 41/00* (2006.01)
(Continued)

(52) U.S. Cl.
CPC ........ *E21B 41/0085* (2013.01); *E21B 17/003* (2013.01); *E21B 17/028* (2013.01);
(Continued)

(58) Field of Classification Search
CPC ...... E21B 33/13; E21B 33/14; E21B 41/0085; E21B 47/13; E21B 36/04; E21B 17/003;
(Continued)

(56) References Cited

U.S. PATENT DOCUMENTS

| | | | |
|---|---|---|---|
| 5,394,141 A | 2/1995 | Soulier | |
| 6,230,800 B1 * | 5/2001 | Bryant | E21B 47/06 166/250.01 |

(Continued)

FOREIGN PATENT DOCUMENTS

| | | |
|---|---|---|
| EP | 0 314 654 | 5/1989 |
| EP | 0314654 A1 | 5/1989 |

(Continued)

OTHER PUBLICATIONS

International Search Report and Written Opinion of the ISA for PCT/GB2017/050912 dated Jan. 26, 2018, 20 pages.

*Primary Examiner* — Brad Harcourt
(74) *Attorney, Agent, or Firm* — Nixon & Vanderhye, PC

(57) ABSTRACT

A monitoring well installation comprising metallic casing (2) running down from the surface into a borehole and a sealing material plug (6) provided downhole for blocking the interior of the casing and sealing the borehole against the egress of fluid from a zone below the plug. There is an axial spacing (2A) between adjacent casing portions (2) in the region of the plug (6) such that there is an uncased length of borehole in which the material of the plug seals against the formation. There is provided a sensing tool (3) located below the plug (6) for sensing at least one parameter below the plug (6) and a communication arrangement (3, 4, 5) for use in transmitting data from the sensing tool (3) towards the surface. The communication arrangement comprises across plug communication apparatus (5) for facilitating transmission of signals carrying data across the plug (6) towards the surface.

29 Claims, 13 Drawing Sheets

(51) Int. Cl.
*E21B 17/00* (2006.01)
*E21B 17/02* (2006.01)
*E21B 17/10* (2006.01)
*E21B 47/00* (2012.01)
*E21B 36/04* (2006.01)
*E21B 33/13* (2006.01)
*H04B 7/155* (2006.01)
*E21B 33/134* (2006.01)

(52) U.S. Cl.
CPC .......... *E21B 17/1078* (2013.01); *E21B 33/13* (2013.01); *E21B 36/04* (2013.01); *E21B 47/00* (2013.01); *E21B 47/13* (2020.05); *H04B 7/155* (2013.01); *E21B 33/134* (2013.01)

(58) Field of Classification Search
CPC .... E21B 17/028; E21B 17/1078; E21B 47/00; E21B 33/134; E21B 41/0035; H04B 7/155
See application file for complete search history.

(56) References Cited

U.S. PATENT DOCUMENTS

| | | |
|---|---|---|
| 2003/0042016 A1 | 3/2003 | Vinegar et al. |
| 2008/0007422 A1 | 1/2008 | Hudson |
| 2009/0145601 A1* | 6/2009 | Bailey ............... E21B 17/028 166/250.04 |
| 2013/0299165 A1 | 11/2013 | Crow |
| 2013/0321165 A1 | 12/2013 | Johannessen |
| 2014/0002088 A1* | 1/2014 | Hudson ............... E21B 47/13 324/324 |
| 2014/0218208 A1 | 8/2014 | Hudson |
| 2014/0320301 A1 | 10/2014 | Hudson |
| 2015/0330214 A1* | 11/2015 | Duphorne ............ E21B 33/13 166/250.08 |
| 2015/0354351 A1 | 12/2015 | Morrow et al. |
| 2016/0010415 A1* | 1/2016 | Myhre ................. E21B 29/04 166/290 |
| 2016/0341030 A1 | 11/2016 | Mulholland et al. |
| 2017/0081956 A1 | 3/2017 | Ganguly et al. |
| 2018/0094519 A1 | 4/2018 | Stephens et al. |
| 2018/0298715 A1* | 10/2018 | Shafer ..................... C09K 8/44 |

FOREIGN PATENT DOCUMENTS

| | | |
|---|---|---|
| EP | 1 076 759 | 2/2001 |
| NO | 20151746 | 10/2016 |
| WO | WO 2010/083210 A1 | 7/2010 |
| WO | WO 2016/076875 A1 | 5/2016 |
| WO | 2017/105251 | 6/2017 |

* cited by examiner

MONITORING WELL INSTALLATIONS

This application is the U.S. national phase of International Application No. PCT/GB2017/050912 filed Mar. 31, 2017 which designated the U.S., the entire contents of which is hereby incorporated by reference.

This invention relates to monitoring well installations. In particular it relates to monitoring well installations which may be installed in an oil and/or gas field to allow monitoring of a parameter within that oil and/or gas field for a prolonged period of time.

There is a general desire to be able to monitor parameters in an oil and/or gas reservoir over time. This might be whilst the oil and/or gas field is active and at least some wells in the field are producing product (oil and/or gas) or it may be before a field becomes active and evaluation is taking place or whilst a field is inactive after a period of production.

In all such circumstances it is important that monitoring can take place with a minimum of risk, in particular a minimum of risk of product escaping from the reservoir towards the surface.

Thus in different circumstances various different sealing devices are used for sealing well installations which have been drilled into an oil field. Cement plugs are often used for long term sealing of the boreholes of wells. The cement based material of the plug is used as a sealing material. Typically the borehole will be lined with metallic casing. Thus when a cement plug is provided in the borehole for sealing a well against the escape of oil and/or gas, sealing between the cement plug and the internal surface of the metallic casing is important. One particular way oil and/or gas may escape is by the formation of escape paths for fluid at the annular interface between the cement plug and the surrounding metallic casing. Another way in which oil and/or gas may escape is through the micro-annulus between the outside diameter of the casing and the cement seal to the inside diameter of the borehole/formation. This outer cement seal is made during well construction by pumping cement into the gap between casing and borehole wall and frequently does not provide a good seal.

At the same time, having one or more cement plug in a borehole for sealing the well can present challenges for extracting data from locations below the cement plug. This is at least partly because putting any form of cable or other component through a cement plug causes another potential leak path past the plug and thus in general terms this has to be avoided.

In the present specification, the expression "surface" encompasses the land surface of a land well where a wellhead would be located, the sea bed/mudline in a subsea well and a wellhead deck on a platform. It also encompasses locations above these locations where appropriate. Generally "surface" is used to refer to any convenient location for applying and/or picking up signals, for example, which is outside the borehole of the well.

In the present specification the expressions "lower", "deeper", "below" etc in the borehole/well mean further into the well away from the well head. Even in a horizontal portion of a borehole it will thus be clear when a location or component is "deeper" or "lower" etc than another as meant in the present specification. Corresponding considerations apply to expressions such as "upper", "shallower", "above" etc.

It would be desirable to provide methods and installations for allowing the monitoring of downhole parameters whilst taking the above issues into account.

According to one aspect of the present invention there is provided a monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against the formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface.

Such an arrangement can provide monitoring of an oil and/or gas reservoir whilst minimising the risk of escape of fluids via the monitoring well.

The axial spacing may have different lengths in different circumstances. For example the axial spacing may be in the range of 1 m to 100 m.

Typically the sealing material plug will be a cement plug of cement based material. But other materials may be used that can be introduced in a form to conform to the space that needs to be filled and then seal to the surroundings. Typically the sealing material will be introduced in a liquid form and set. Typically this will be a chemical setting process. The sealing material may be a solidified material. The sealing material will typically be an insulating material. The sealing material may have a resistivity which is at least ten times that of the metal of the metallic casing.

It will be appreciated that where there are a plurality of runs of casing at the location where the axial spacing, or gap, is formed, an axial spacing will be provided in each run of casing so that the sealing material can seal to the formation. The gap in each run of casing may have the same length and the gaps may all be in register with one another.

The communication arrangement may comprise a below plug communication unit located below the plug for transmitting signals carrying data towards the surface. The across plug communication apparatus may comprise the below plug communication unit.

The communication arrangement may comprise at least one repeater communication unit for receiving signals from the below plug communication unit and transmitting signals onwards towards the surface. The across plug communication apparatus may comprise the at least one repeater communication unit.

The at least one repeater communication unit may be located above or below the plug. There may be at least two repeater communication units with at least one located below the plug and at least one located above the plug.

The communication arrangement may comprise a plurality of repeater communication units which are all arranged in a chain for communicating one to another.

Note that the or each repeater communication unit may receive signals directly or indirectly from the below plug communication unit. Further any one repeater communication unit may operate in one of a number of different ways provided it performs the function of assisting in transmission of the desired data between the appropriate locations—it may for example be implemented as a pure amplifier picking up, amplifying and reapplying the signals, or it may receive signals perform some processing beyond mere amplification and re-transmit them, accordingly the signals may be retransmitted in the same or a different form than received (eg different modulation scheme, different carrier signal or different signalling technique/transmission medium altogether), in some cases the data to be transmitted may be extracted from the received signal at the repeater communication unit and used to generate a new signal encoding appropriate data, and so on.

The system may be arranged for signalling in both directions. As such: the below plug communication unit may be arranged for receiving signals; and the at least one repeater communication unit may be arranged for transmitting signals onwards towards the below plug communication unit in response to signals received from elsewhere.

The communication arrangement may be arranged to use one or more of a plurality of signalling techniques, for example one or more of:

EM signals;
Acoustic signals;
Inductive signals;
Radio Frequency signals;
Impedance modulation signals;
Optical signals;
Pressure pulse signals;
Hydraulic control line signals; and
Cable carried electrical signals.

Different signalling techniques may be chosen for different respective parts of the signal channel between the below plug communication unit and the surface. Thus one or more repeater communication unit may be arranged to pick up (and optionally apply) one type of signals from a first part of the signal channel and may be arranged to apply (and optionally pick up) another type of signals to a second part of the signal channel.

In some cases two or more signalling techniques may be used in parallel. This can give redundancy to improve robustness.

The below plug communication unit or repeater communication unit may have a first contact which contacts with the casing and a second contact which contacts with the formation at an open hole location. The below plug communication unit or repeater communication unit may be arranged to apply (and optionally pick up) signals via a elongate metallic member that extends from a cased region to an open hole region. The below plug communication unit or repeater unit may apply signals to (and optionally pick up signals from) the elongate metallic member via an inductive coupling provided around the metallic elongate member or across an insulation joint in the elongate member.

The communication arrangement may comprise inplug apparatus located within the sealing material plug for assisting in communication across the plug. The across plug communication apparatus may comprise the inplug apparatus.

The inplug apparatus may be entirely enclosed within the sealing material plug. In other cases a portion of the inplug apparatus may be exposed to the exterior or extend beyond the material of the plug.

The inplug apparatus may comprise an axially extending metallic member running within the sealing material plug.

The axially extending member may act as a leg of a communication channel across the axial spacing in the casing.

The axially extending metallic member may be arranged for carrying electrical signals during communication.

The axially extending metallic member may bridge the axial spacing in the casing.

The axially extending metallic member may comprise a length of downhole pipe. The length of downhole pipe might be used during installation in a process for delivering material downhole for forming the plug.

The inplug apparatus may comprise at least one repeater communication unit.

The communication arrangement may comprise connection means for electrically connecting a casing portion below the axial spacing to a casing portion above the axial spacing.

The connection means may comprise the axially extending metallic member.

The axially extending metallic member may be electrically connected to a first casing portion on one side of the gap via a conductive component embedded in the sealing material plug.

The axially extending metallic member may be electrically connected to a second casing portion on the other side of the gap via a conductive component provided externally of the sealing material plug.

The axially extending metallic member may be electrically connected to a second casing portion on the other side of the gap via a conductive component embedded in the sealing material plug.

The axially extending metallic member may be electrically connected to a first casing portion on one side of the gap via a conductive component provided externally of the sealing material plug.

Thus in some cases there may be two embedded conductive components, in others there may be two external conductive components, and in others there may be one of each.

The axially extending metallic member may be electrically connected to the respective casing portion via a conductive centraliser embedded in the sealing material plug.

The axially extending metallic member may be electrically connected to the respective casing portion via a hanger provided at one end of the sealing material plug.

In any or all cases the electrical connection may be a galvanic connection.

The inplug apparatus may comprise a length of cable. The inplug apparatus may comprise two communication repeaters electrically connected to one another via a length of cable. The inplug apparatus may comprise a length of cable and an axially extending metallic member, and the cable may run alongside the axially extending metallic member.

Where the inplug apparatus comprises an axially extending metallic member, the sealing material plug may comprise an end cap portion through which the axially extending metallic member does not extend.

The communication arrangement may comprise a short hop communication means for communication across the end cap. The short hop communication means may be arranged to use, for example, one of inductive signalling, acoustic signalling or RF signalling.

There may be an end cap at each end of the plug and a respective short hop communication means for signalling across each end cap.

In one set of embodiments, the inplug apparatus may comprise two communication repeaters electrically connected to one another via a length of cable, one of which repeaters is disposed adjacent the end cap for facilitating short hop communication across the end cap and the other of which is disposed towards an opposite end of the sealing material plug.

In one embodiment the inplug apparatus comprises an axially extending metallic member provided in two sections which are electrically insulated from another and the inplug apparatus further comprises a communication repeater connected between the two sections for applying signals thereto and/or picking up signals therefrom.

Where the axially extending metallic member is downhole pipe, the two sections may be connected together by a gap sub (isolation joint).

In another embodiment the inplug apparatus comprises two axially extending metallic member portions which are spaced from one another and electrically insulated from another and which each have a first portion embedded in the sealing material plug and a second portion extending to the end of or beyond the end of the sealing material plug, with a first of the metallic member portions extending to or beyond a first end of the plug and a second of the metallic member portions extending to or beyond a second end of the plug and the communication arrangement further comprising a transmitter or transceiver for applying electrical signals to the first metallic member portion at a location towards the first end of the plug for causing generation of an electric field in the plug and a receiver or transceiver for picking up, from the second metallic member portion at a location towards the second end of the plug, electrical signals induced in the second metallic member portion by the electric field generated in the plug.

In other embodiments the across plug communication apparatus comprises at least one electrode for applying electrical signals to the formation and/or picking up electrical signals from the formation, the electrode being provided outside of the casing in the region of the sealing material plug and insulated from the casing, and the across plug communication apparatus further comprising at least one of a transceiver, transmitter and receiver connected between the electrode on the one hand and an adjacent portion of the casing on the other hand.

A first such electrode and respective transceiver, transmitter and receiver may be provided below the axial spacing in the casing and a second such electrode and respective transceiver, transmitter and receiver may be provided above the axial spacing in the casing.

In other embodiments the across plug communication apparatus comprises a transducer provided adjacent a first end of the plug and a detector provided adjacent a second end of the plug, the transducer arranged to apply data carrying signals to the material of the plug and the detector arranged to pick up said data carrying signals from the material of the plug.

The transducer may be arranged to apply at least one of: EM signals; Acoustic signals; Inductive signals; Radio Frequency signals, and the detector may be arranged to pick up the corresponding signals.

In one particular example the transducer may comprise magnetic field generating means and the detector may comprise a magnetic field sensing means.

In another particular example the transducer may comprise a hammer member for applying vibrational, acoustic, signals to the plug and the detector may comprise an acoustic sensor.

Such techniques using a transducer and detector for sending signals through the material of the plug, are likely to be most effective when the axial length of the plug is relatively short—say 1 m to 20 m.

In other embodiments a break is provided in the metallic casing on at least one side of the axial spacing so forming a casing section which is not galvanically connected to the remainder of the casing on the respective side of the axial spacing and the across plug communication apparatus comprises said casing section as an electrode for applying electrical signals to the formation and/or for picking up electrical signals from the formation.

This can dramatically increase the effectiveness of signalling across the sealing plug and its corresponding axial spacing.

The break in the run of metallic casing may comprise an auxiliary axial spacing in the casing.

This may lead to a fluid communication path between the interior of the casing and the annulus between the exterior of the casing and the formation. However, due to the nature of the seal provided by the sealing material plug to the formation, this can be tolerated.

In an alternative, rather than an open auxiliary axial spacing, an insulation joint may be provided in the run of metallic casing to provide the break in the metallic casing and hence the electrode. In such a case there may be no fluid communication path created by the break. In yet another alternative, if an open auxiliary axial spacing is used, the spacing might be filled with cement or another sealing material.

The below plug communication unit may be arranged to apply and/or pick up signals across the break in the metallic casing.

The at least one repeater communication unit may be arranged to apply and/or pick up signals across the break in the metallic casing.

More generally expressed, at least one of a transceiver, transmitter and receiver may be connected between said casing section and the remainder of the casing on the respective side of the axial spacing for applying and/or picking up electrical signals. As will be appreciated at least one of a transceiver, transmitter and receiver may be part of the below plug communication unit and/or may be part of the at least one repeater communication unit.

A respective break in the metallic casing may be provided on each side of the axial spacing.

Thus a respective communication unit may be arranged to apply and/or pick up signals across each break in the metallic casing.

Again more generally expressed, at least one of a transceiver, transmitter and receiver may be connected between each said casing section and the respective remainder of the casing on the respective side of the axial spacing for applying and/or picking up electrical signals.

In at least some cases electrical power may be transmitted across the plug using arrangements where there is a break in the casing on one (and preferably on both) sides of the axial spacing.

Thus the at least one of a transceiver, transmitter and receiver may be arranged for applying and/or picking up electrical power signals. This may be instead of or as well as applying and/or picking up data carrying electrical signals.

According to another aspect of the invention there is provided a well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against the formation in which the borehole is drilled, and wherein there is provided a downhole tool located below the plug requiring electrical power and across plug power delivery apparatus for delivering power to the tool across the plug, and wherein a break is provided in the metallic casing on at least one side of the axial spacing so forming a casing section which is not galvanically connected to the remainder of the casing on the respective side of the axial spacing and the power delivery apparatus comprises said casing section as an electrode for applying electrical power signals to the formation and/or for picking up electrical power signals from the formation.

Most typically a break in the casing may be provided above the axial spacing for use in the application of electrical power signals to the formation above the plug.

A break in the casing below the axial spacing may be provided as well as or instead of above the axial spacing for use in picking up electrical power signals from the formation below the plug.

The provision of at least one break in the casing as defined dramatically increases the efficiency of electrical signal transfer across the plug, making the delivery of power practical without the presence of components within or running through the plug itself.

Where a break is provided in the casing, insulation may be provided between the casing and the formation in a region on the side of the break which leads away from the axial spacing.

The insulation may extend from the break to at least a point at which there is electrical connection between said remainder of the casing and the at least one of a transceiver, transmitter and receiver.

Where there is more than one break, respective insulation may be provided at each.

The across plug communication apparatus may comprise a tool housing the at least one of a transceiver, transmitter and receiver.

The across plug power delivery apparatus may comprise a tool housing the at least one of a transceiver, transmitter and receiver.

There may be a common tool which acts as part of both the across plug communication apparatus and the across plug power delivery apparatus.

In some cases the across plug communication apparatus may also act as the across plug power delivery apparatus. That is to say, one set of apparatus may be used for both transmitting power as well as data.

The below plug communication unit may comprise said tool. The repeater communication unit may comprise said tool.

The below plug communication unit may be arranged to apply and/or pick up signals across the break in the metallic casing.

The at least one repeater communication unit may be arranged to apply and/or pick up signals across the break in the metallic casing.

The tool may comprise a first contact which contacts with the casing section which acts as an electrode and a second contact which contacts with the remainder of the casing. One of the contacts may comprise a hanger or setting device. One of the contacts may comprise a conductive centraliser.

The tool may comprise an electrically conductive housing with a first end electrically connected to the first contact and a second end electrically connected to the second contact, wherein the first end of the housing is insulated from the second and the at least one of a transceiver, transmitter and receiver is electrically connected between the first and second ends of the housing.

In an alternative set of embodiments the at least one of a transceiver, transmitter and receiver is electrically connected to the section of the casing that acts as an electrode via a cable.

In a further alternative set of embodiments the across plug communication apparatus and/or power delivery apparatus may comprises a transformer arrangement via which the at least one of a transceiver, transmitter and receiver applies signals to and/or picks up signals from the section of the casing that acts as an electrode.

A first winding of the transformer arrangement may be connected between the at least one of a transceiver, transmitter and receiver and said remainder of the casing. A second winding of the transformer arrangement may be connected between said remainder of the casing and the section of the casing which acts as an electrode.

This allows for impedance matching to the electrode and the at least one of a transceiver, transmitter and receiver. Typically the first winding will have more turns than the second winding.

This can be particularly important when the at least one of a transceiver, transmitter and receiver is arranged for transmitting and/or receiving electrical power.

The well installation may comprise at least one auxiliary sealing material plug disposed at a different depth within the borehole for blocking the interior of the casing and sealing the borehole against the egress of fluid from a zone below the respective auxiliary plug. There may or may not be a corresponding axial spacing between adjacent casing portions in the region of each auxiliary plug. Thus there might be only one such axial spacing, the auxiliary plugs being disposed at fully cased locations.

Where there is at least one auxiliary plug, the communication arrangement can be arranged for signalling past the auxiliary plug. Typically signals may progress in the casing past the location of an auxiliary plug—ie where there is no corresponding axial spacing at that location. Alternatively other means may be provided for signalling past an auxiliary plug—such as those defined above for signalling past the plug located at the region of the axial spacing.

At least one auxiliary plug may be at a location below the plug located at the region of the axial spacing.

The sensing tool may be located below said auxiliary plug.

The installation may comprise a plurality of sensing tools disposed at respective different locations. A first of the sensing tools may be located below said auxiliary plug. A second of the sensing tools may be located above said auxiliary plug but below the plug located at the region of the axial spacing.

At least one auxiliary plug may be at a location above the plug located at the region of the axial spacing.

In one embodiment the well installation comprises the plug located at the region of the axial spacing, a first auxiliary sealing material plug located above the plug located at the region of the axial spacing, a second auxiliary sealing material plug located below the plug located at the region of the axial spacing and a further component plug located below the second auxiliary sealing material plug, wherein a first sensing tool is provided below the further component plug;

a second sensing tool is provided between the further component plug and the second auxiliary sealing material plug;

a first repeater communication unit is disposed between the second auxiliary sealing material plug and the plug located at the region of the axial spacing;

a second repeater communication unit is disposed between the first auxiliary sealing material plug and the plug located at the region of the axial spacing at a location towards the plug located at the region of the axial spacing; and a third repeater communication unit is disposed between the first auxiliary sealing material plug and the plug located at the region of the axial spacing at a location towards the first auxiliary sealing material plug.

This can facilitate measuring of parameters at two locations and transmission of signals across the plugs.

According to another aspect of the present invention there is provided a method of creating a monitoring well installation in a cased borehole comprising the steps of:

creating axial spacing between adjacent casing portions at an intended location for a sealing material plug which is to be provided downhole in the borehole for blocking the interior of the casing and sealing the borehole against the egress of fluid from a zone below the plug, the axial spacing of the casing portions being such that there is an uncased length of borehole in which the material of the plug may seal against with the formation in which the borehole is drilled;

installing a sensing tool below the intended location of the plug for sensing at least one parameter below the plug;

providing a communication arrangement for use in transmitting data from the sensing tool towards the surface wherein the communication arrangement comprises across plug communication apparatus for facilitating transmission of signals carrying data across the plug towards the surface; and creating the sealing material plug at the downhole location.

Note that whilst in practical terms the sensing tool will be installed before the plug, some or all of the communication arrangement may be installed after the installation of the plug.

The axial spacing may be created by one of a number of different means. For example the casing may be cut and upper sections pulled upwards to create the spacing, the material of the casing may be machined, for example milled out to create the spacing, the spacing may be created chemically, for example using thermite.

Note that in general each of the optional features following each of the aspects of the invention above is equally applicable, where context allows, as an optional feature in respect of each of the other aspects of the invention and could be re-written after each aspect with any necessary changes in wording.

Not all such optional features are re-written after each aspect merely in the interests of brevity.

Embodiments of the present invention will now be described, by way of example only, with reference to the accompanying drawings in which:

FIG. 1 schematically shows a monitoring well installation;

FIG. 2 schematically shows part of a well installation of the type shown in FIG. 1 in more detail including a first communication arrangement;

Figure 1:
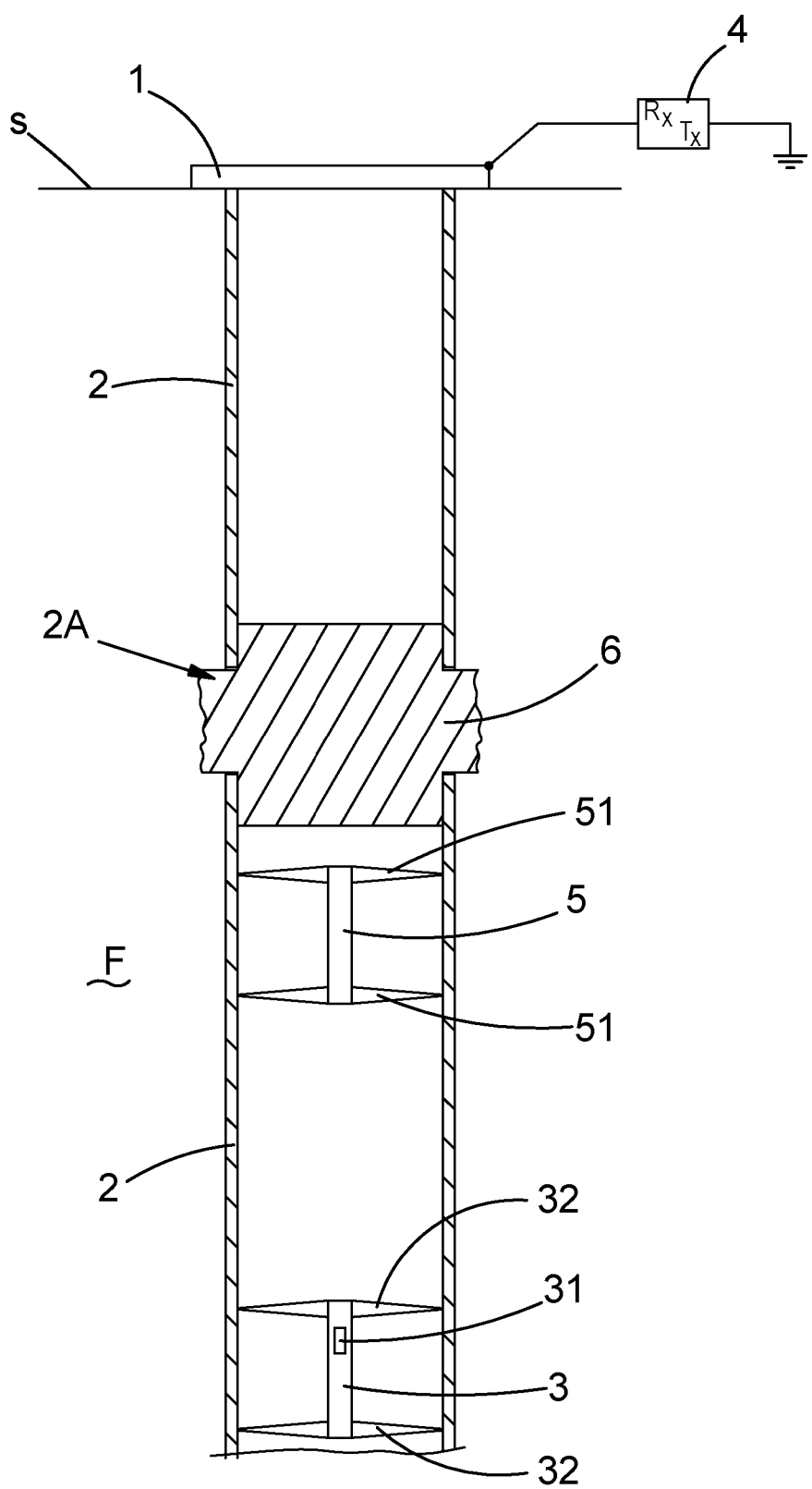

FIG. 1 schematically shows a monitoring well installation comprising a wellhead 1 and casing 2 descending into a borehole in the formation F. A downhole sensing tool 3 is located downhole in the well for sensing a parameter in its region. Thus for example the sensing tool 3 may be arranged for sensing pressure and/or temperature.

In other alternatives the sensing tool 3 may be arranged for sensing a different parameter which happens to be of interest in a given circumstance. Thus besides temperature and/or pressure a sensor might be arranged to, for example, measure acceleration, vibration, torque, movement, motion, cement integrity, direction and inclination, load, casing angle, corrosion and erosion, radiation, noise, magnetism, seismic movements, stresses and strains on casing including twisting, shearing, compression, expansion, buckling and any form of deformation, chemical or radioactive tracer detection, fluid identification such as hydrate, wax or sand production and fluid properties such as (but not limited to) flow, density, water cut, pH and viscosity. Similarly the sensors may be of different types and may be imaging, mapping and/or scanning devices such as, but not limited to, camera, video, infrared, magnetic resonance, acoustic, ultrasound, electrical, optical, impedance and capacitance.

The exact nature of the parameter to be monitored is not of particular pertinence to the present invention. What is of interest is the ability to provide a monitoring well which allows the extraction of data from a downhole location whilst minimising the risk of escape of fluid via the monitoring well.

The monitoring well comprises a communication arrangement which in turn comprises a below plug communication unit 31, located in this embodiment in the sensing tool 3, an upper communication unit 4 provided, in this case, at the surface S and a repeater communication unit 5.

In this embodiment the sensing tool 3 and the repeater unit 5 are both located in the well at a location below a cement plug 6 which is provided in the borehole for blocking the interior of the casing and sealing the borehole against the egress of fluid from a zone below the plug 6.

An axial spacing 2A is provided in the run of casing 2 in the region of the plug 6. That is to say, there is an uncased section of the borehole in the region of the cement plug 6 which in turn means that the cement of the plug bonds directly with the formation F in which the borehole is drilled.

This can lead to an improved sealing of the borehole compared with the situation where the cement plug 6 is formed entirely within the casing 2 as would be conventional. That is to say, a better seal against the egress of fluid can be provided with the present arrangement compared with a situation where the plug is provided wholly within the casing. This is because when cement is provided within casing then inevitably during formation of the plug there is a tendency for the cement to shrink. This in turn risks causing one or more gaps at the interface between the cement and the casing which may allow the escape of fluids either immediately upon installation of the plug or after some time as the seal degrades. In some conventional installations elastomers are provided at the interface between the plug and the casing to try to guard against such leaks. Elastomers cannot however be relied upon in the long term as their elastic properties degrade due to temperature and chemical effects.

It has been determined that a better seal can be obtained if a gap 2A is provided between two casing sections 2 and the cement plug 6 is allowed to seal against and optionally, bond directly with, the formation in the region of this axial spacing. Note that the axial spacing 2A is such that there is an entirely uncased region between the two casing sections above and below the level of the plug 6. That is to say there is contact between the cement plug and the formation F surrounding it around the whole of the circumference of the plug 6 at this region. If there was more than one run of casing at this location, an axial spacing would be provided in each run.

Note that the casing 2 portion below the axial spacing 2A, the casing 2 portion above the axial spacing 2A and the uncased section of borehole are all in the same (or a common) borehole. Thus this is distinct from a situation where there may be a gap between casing portions one of which is provided in a main bore and one of which is provided in a lateral. In the present case the borehole is a main bore of the well, but in other cases the borehole could be a lateral borehole, with the casing portions 2 and axial spacing 2A in the lateral as a common borehole.

The axial spacing 2A may be created in various ways. The casing 2 may be cut and pulled to create the spacing, a portion of casing 2 may be machined out, or a portion of the casing 2 may be removed by chemical means.

In the present embodiment parameters are measured by the downhole sensing tool 3. The acquired data is encoded and applied by the below plug communication unit 31 as wireless time varying EM signals to the casing 2 below the plug 6. These signals are then picked up by the repeater communication unit 5 at a location close to but below the plug 6. Signals are reapplied to the casing 2 by the repeater communicator unit 5 such that they may be transmitted past the plug 6 again as EM signals through the material of the formation F and the plug 6. The signals are then picked up by the casing 2 above the level of the plug 6 and travel onwards towards the surface for detection by the upper communication unit 4.

The below plug communications unit 31 comprises a transmitter or transceiver and is arranged for applying signals onto the casing 2 by use of a spaced pair of conductive centralisers 32, one of which is provided at each end of the downhole sensing tool 3. As is now well established in downhole EM communication techniques, signals may be applied onto casing for transmission along the casing 2 as a transmission channel by use of such an arrangement where in effect the downhole sensing tool 3 generates a voltage dipole in the casing and signals progress away therefrom along the casing 2 or other metallic structure present. Similarly such an arrangement may be used for picking up signals.

The below plug communication unit 31 may use other mechanisms for applying and picking up EM signals, for example inductive couplings may be used.

Whilst this type of dipole communication is known for communicating where there is continuous casing (or other metallic structure), different considerations apply when there is a break in the metallic structure in a common borehole. This situation is also different from where there is a gap in casing where a lateral joins a main bore as mentioned above. Whilst not at all clear that this would be the case, the applicants have determined that a similar technique can be used to achieve communication across a plug provided at a gap in the casing in a common bore as described above.

Thus the below plug repeater communication unit 5 comprises a transceiver and conductive centralisers 51 providing spaced contact into the casing 2 to pick up signals and to apply them by producing a voltage dipole. The upper portion of this dipole will generally be of higher impedance than below the below plug repeater communication unit 5 and therefore will achieve a higher proportion of the voltage created by the dipole arrangement.

In this embodiment the below plug repeater communication unit 5 functions as across plug communication apparatus. The below plug repeater communication unit 5 generates a voltage dipole in the casing portion 2 below the axial spacing 2A which in turn creates electric field in the formation F. In turn this induces current in the casing portion 2 above the axial spacing 2A. The induced electric current can be detected by suitable equipment above the axial spacing 2A in the casing 2—in this case at the upper communication unit 4.

Whilst an arrangement such as that shown in FIG. 1 may work satisfactorily in some circumstances in practical terms there will be limits on the data rates which are achievable with the arrangement shown in FIG. 1 and/or limits on the distance over which such a signalling technique will work. Thus, there may be limits on the depth of the well in which such a technique may be used or limits on the depth of the cement plug which may be bridged using such a technique or limits on the depth at which the plug 6 may be located in the well when using the arrangement of FIG. 1.

That said, in some circumstances an even simpler system may be used where the below plug repeater communication unit 5 is dispensed with. In such a case the below plug communication unit 31, which is at or communicatively connected (by eg wired or short hop wireless communication) to the sensing tool 3 may act as across plug communication apparatus providing the function given by the repeater in the above embodiment. This might be most practical if the downhole sensing tool 3 is located close to the underside of the plug 6.

Whilst the system shown in FIG. 1 and described in reference thereto relates to one where EM signalling is used, different signalling techniques may be used and more than one different signalling technique may be used over different legs of the whole communication channel between the downhole sensing tool 3 and the upper communication unit 4.

Below are examples of other communication arrangements which may be used in monitoring the well installations of the present type. These help to illustrate the different types of communication techniques and arrangements which may be used in general, and can be used in an effort to improve performance over that which may be achieved with the arrangement shown in FIG. 1.

Figure 2:
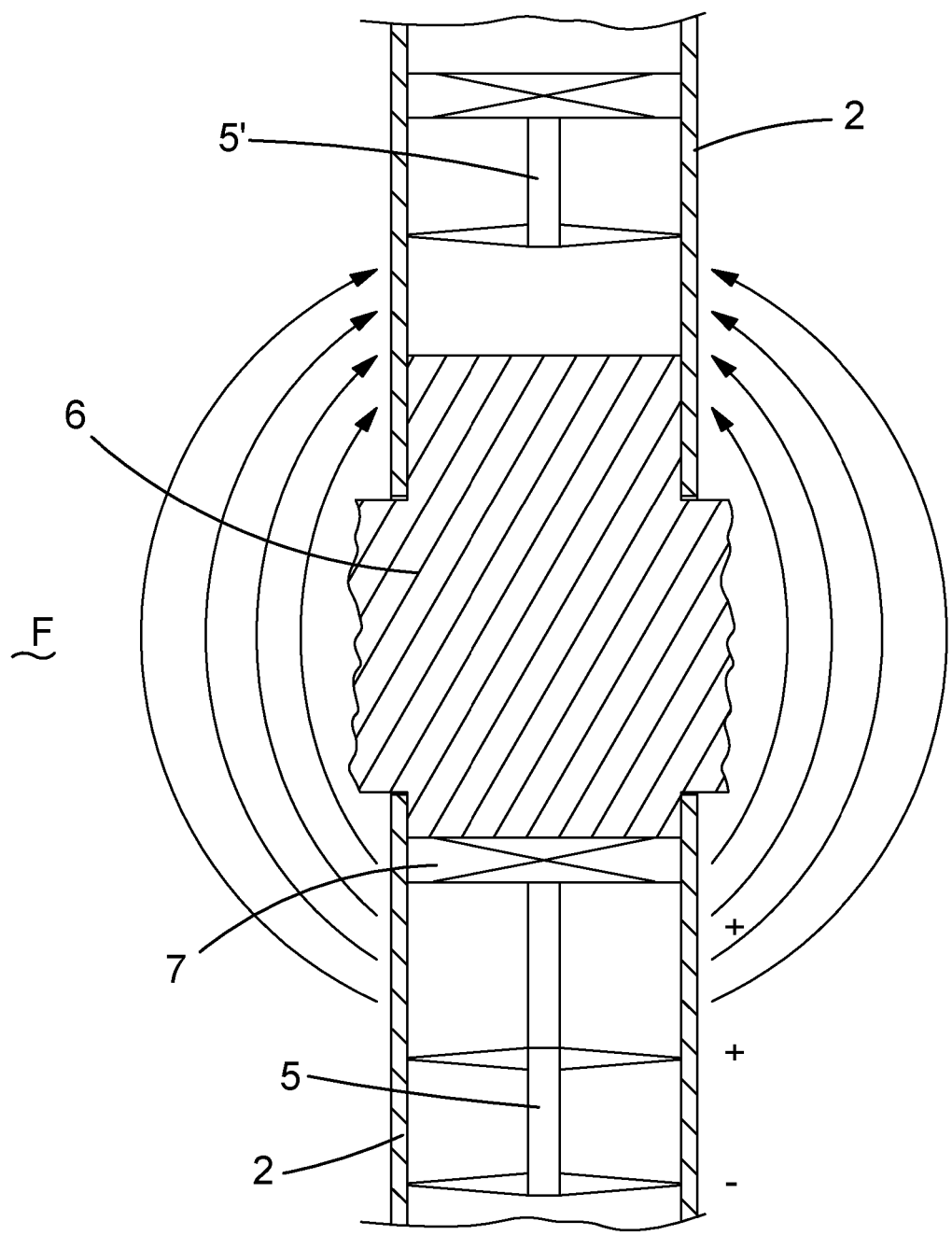

FIG. 2 shows part of a well installation which is similar to that shown in FIG. 1 but with a different arrangement in the region of the cement plug 6. The remainder of the well installation of FIG. 2 is the same as the remainder of well installation that is shown in FIG. 1 and description of it is omitted.

In the embodiment shown in FIG. 2 a second repeater unit 5' is provided adjacent to but above the cement plug 6.

Again in this embodiment signalling across the plug 6 is achieved using EM techniques with the signals progressing through the material of the formation F and the cement plug 6 itself. It can be expected that a stronger signal may be picked up from the casing 2 in the region of the second repeater unit 5' than would be picked up directly at the upper unit 4 in the arrangement shown in FIG. 1. The second repeater unit 5' may then reapply signals for onward transmission to the surface.

In another alternative the upper repeater unit 5' may, say, apply acoustic signals to the casing 2 above the plug 6 and the upper unit 4 may be arranged for picking up acoustic signals.

Further in the embodiment shown in FIG. 2 the lower repeater communication unit 5 is suspended from a hanger 7 provided at a lower end of the cement plug 6. Note that the hanger 7 will also typically be used in part of the process for forming the plug 6 in the borehole.

Figure 3:
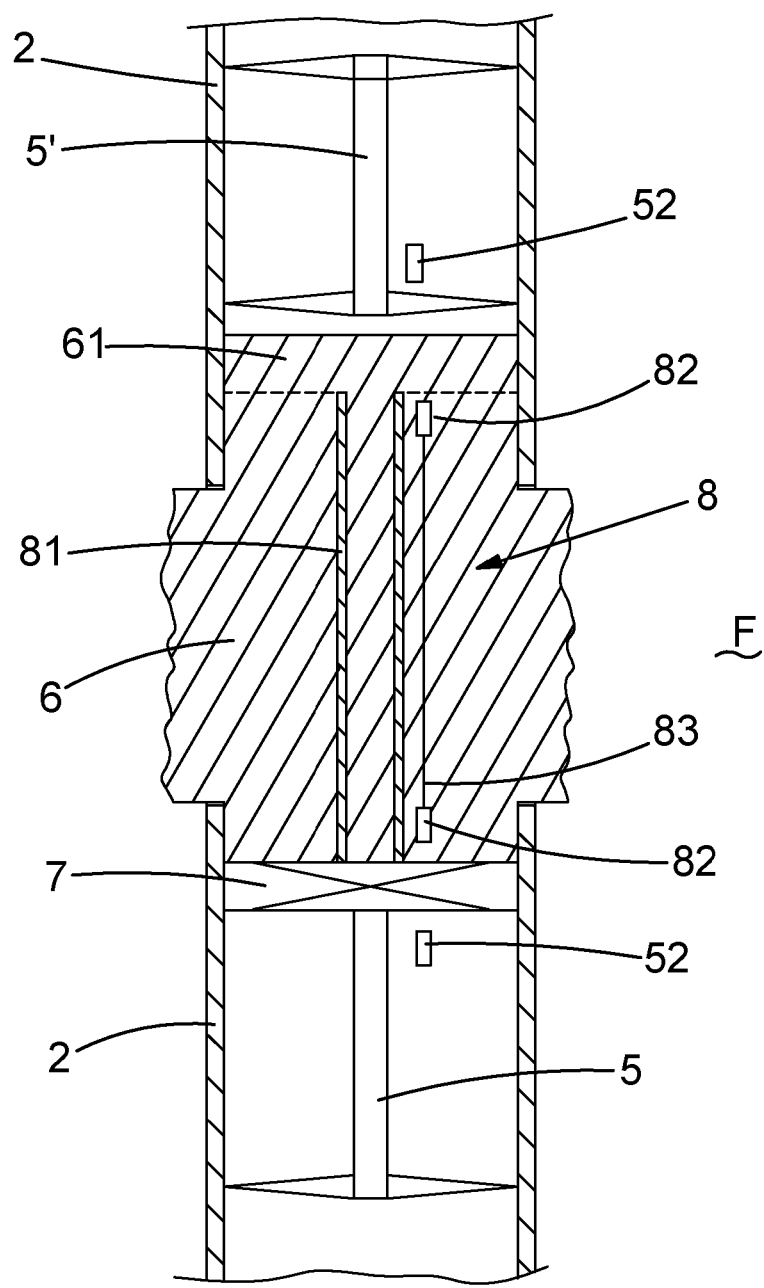
FIG. 3 shows a similar portion of a monitoring well installation including a second communication arrangement.

FIG. 3 shows part of an alternative communication arrangement which may again be used in a well installation of the general type shown in FIG. 1. Here the communication arrangement comprises inplug apparatus 8 provided for assisting communication across the plug 6. The inplug apparatus 8 comprises an axially extending metallic member 81 running within the plug 6.

In this embodiment the axially extending metallic member comprises a length of downhole pipe which is used as part of the process for forming the plug 6. In formation of the plug 6, cement is pumped downhole via a length of downhole pipe from the surface and allowed to form the plug 6 above the level of a hanger 7 which is fixed in the casing 2. The cement leaves the downhole pipe 81 in the region where the plug 6 is formed and fills this cavity including the space in contact with the surrounding formation F. After the main body of the plug 6 is formed the pipe used to feed the cement downhole to the location of the plug 6 can be removed leaving only the section 81 shown in FIG. 3. After this an end cap cement portion 61 may be added to the already present cement of the plug 6 to form the overall plug 6. As can be seen the metallic pipe 81 does not extend through the end cap portion 61. Thus the metallic pipe portion 81 is not exposed at the upper end of the plug 6 but rather contained within the plug 6. This helps ensure that the presence of the metallic pipe portion 81 does not constitute an increased risk of leaks.

The inplug apparatus 8 further comprises two communication repeaters 82 which are connected together via a length of cable 83 which runs alongside the metallic member 81. In practice the communication repeaters 82 and cable 83 are mounted to the metallic member 81 within the plug 6.

Here a first repeater unit 5 is located just below the plug 6 and a second repeater unit 5' is located just above the plug 6.

These two repeater units 5, 5' are arranged for communication with the respective inplug repeater 82 which is located nearest to the end of the plug 6 at which the respective repeater communication unit 5, 5' is located. Transmission of signals across the plug 6 starts at the repeater unit 5 located below the plug 6 from where there is a relatively short hop to the first inplug repeater 82. Then signalling passes along the cable 83 to the second inplug repeater 82 and again there is a relatively short hop to the repeater communication unit 5' located above the plug 6.

In the present embodiment the repeater communication unit 5 below the plug 6 comprises an acoustic communication unit 52 for acoustic communication with the lower inplug repeater 82 and similarly the repeater communication unit 5' above the plug 6 comprises an acoustic communication unit 52 for acoustic communication with the upper inplug repeater 82. At the same time the repeater communication unit 5 below the plug 6 is arranged for picking up EM signals from the casing 2 and the communication repeater unit 5' provided above the plug 6 is arranged for applying the EM signals back onto the casing 2 for onwards transmission.

Thus in the present embodiment the signal channel in the region of the plug 6 has various legs. There is an EM leg up to the below plug repeater unit 5, then an acoustic leg into the plug 6, then an electrical leg along the cable 83, another acoustic leg out of the plug 6 and to the repeater unit 5' above the plug, and then another EM leg onto the casing 2. This can provide a better overall communications channel than that of the arrangement shown in FIGS. 1 and 2 since there is not reliance on EM signals transmitting through the formation F in the region of the gap 2A in the casing. Note that relatively small distances can be maintained for the acoustic links used at each end of the plug 6.

In alternatives different arrangements can be envisaged. In particular different communication techniques can be used for communicating across this short hop between the inplug repeaters 82 and the adjacent external repeater units 5, 5'. In one particular example a radio frequency link could be used in one or both of these locations. As a further alternative, for example, inductive signalling could be used to bridge one or both of these gaps.

Figure 4:
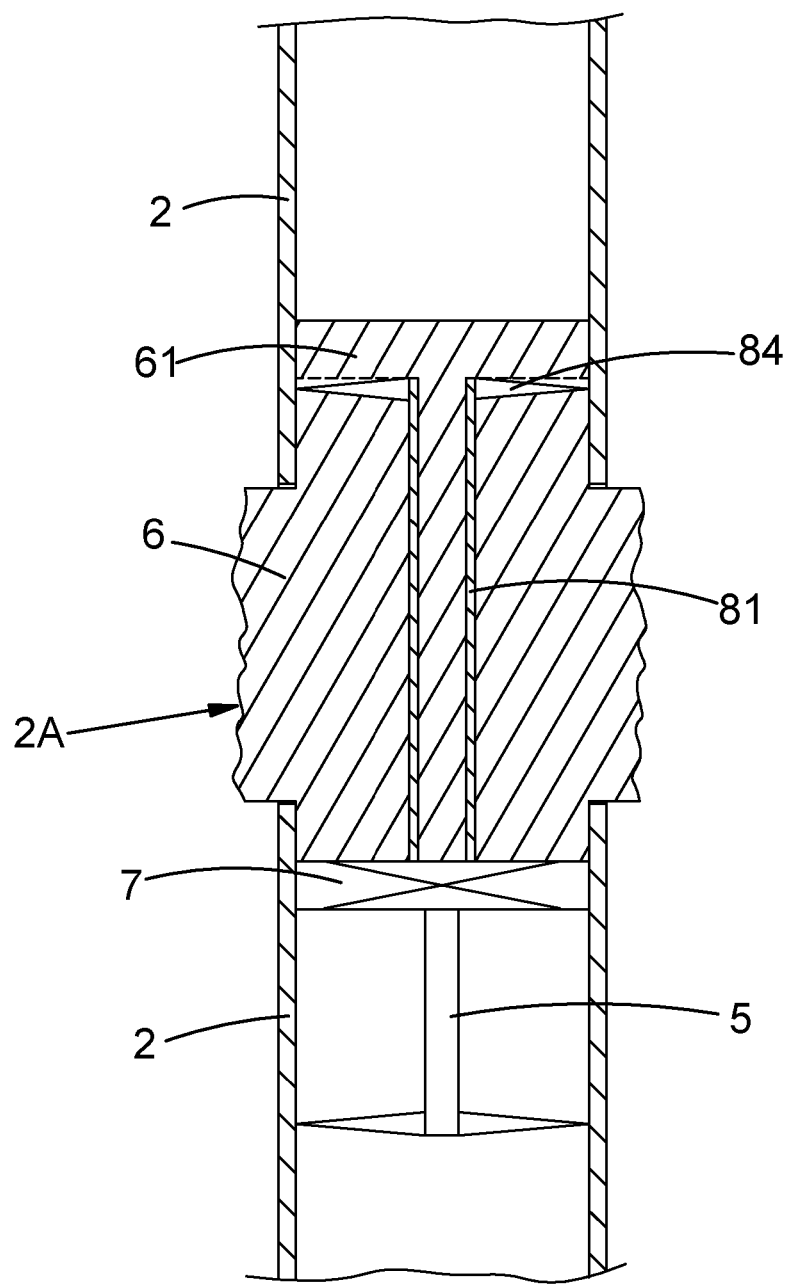
FIG. 4 shows a similar portion of a monitoring well installation including a third communication arrangement.

FIG. 4 shows another alternative communication arrangement in the region of the cement plug 6. Here again there is inplug apparatus. In this embodiment the inplug apparatus comprises an axially extending metallic member 81. In this particular implementation this member 81 is again a portion of downhole pipe which as described above may also have been used in the formation of the plug 6. Here the metallic member 81 is electrically connected to the casing 2 both below and above the gap 2A in the casing 2. Thus in the present embodiment the inplug apparatus facilitates electrical connection between the casing 2 below the plug 6 and the casing 2 above the plug 6 so bridging the gap in the casing 2A. This means that electrical signals applied to the casing 2 may run past the gap 2A in the casing.

In the present embodiment the inplug apparatus comprises a conductive centraliser 84 embedded in the cement plug 6 and surrounded by cement save for its extremities which are arranged to be in electrical contact with the casing 2. In the present embodiment this conductive centraliser 84 is provided above the level of the gap 2A and connects an upper end of the axially extending metallic portion 81 to the casing 2, above the gap 2A. On the other hand the other end of axially extending metallic portion 81 is connected to the casing 2 below the gap 2A via a conductive hanger 7. In alternatives a pair of embedded conductive centralises might be provided—one at each end of the metallic member 81.

Again in this embodiment an end cap portion 61 of cement plug is provided and this is located above the conductive centraliser 84.

In the present embodiment a repeater communication unit 5 is provided just below the level of the plug 6 such that EM signals may be provided to the casing 2 just below the plug 6.

Where a repeater unit 5 is provided in a location adjacent the plug 6 then in an alternative it may be unnecessary to form an electrical connection between the axially extending metallic member 81 and the casing 2. That is to say, the axially extending member 81 may form part of the communication channel and act as a bridge across the axial spacing 2A in the casing by virtue of one or both ends of the axially extending metallic member 81 being connected to an appropriate communication repeater unit provided in the region of the plug 6. In effect the axially extending member 81 may act as a cable between two repeater units.

Figure 5:
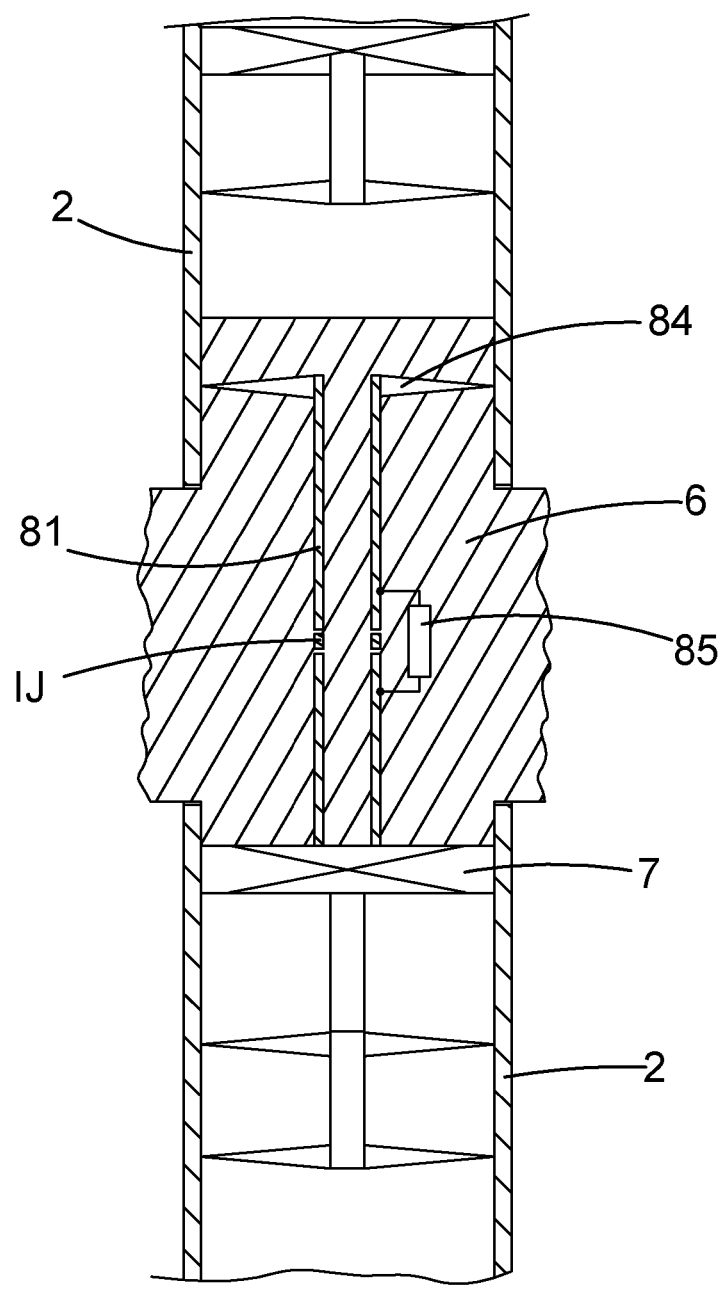
FIG. 5 shows a similar portion of a monitoring well installation including a fourth communication arrangement.

FIG. 5 shows yet a further alternative communication arrangement which may be used in a well installation of the type shown in FIG. 1.

Here again inplug apparatus is provided. In this instance the inplug apparatus comprises an axially extending metallic member 81 which is connected at its upper end via an embedded conductive centraliser 84 to the casing 2 above the axial spacing 2A and connected at its lower end to the casing 2 below the axial spacing 2A via a hanger 7. Here the inplug apparatus also comprises a repeater unit 85 which is arranged for picking up signals transmitted from below the plug 6 and reapplying the signals for transmission above the plug 6.

In the present embodiment the repeater unit 85 is connected across an isolation joint IJ (gap sub) provided in the axially extending metallic member 81. Thus it will be appreciated that there is not a direct electrical path from the upper casing 2 through to the lower casing 2 in this arrangement, but rather electrical signals may be picked up by the repeater unit 85 across the isolation joint IJ and applied across the isolation joint IJ for onwards transmission.

In an alternative rather than the provision of an isolation joint IJ, the axially extending metallic member 81 may be electrically continuous through the plug 6 as in the case of FIG. 4 and a different mechanism used for picking up and applying signals by the repeater unit 85. As an example inductive coupling might be used for the application and picking up of signals by the repeater unit 85 in such a situation.

The above description has concentrated on the arrangement around the cement plug 6 provided in the location where there is a gap 2A in the run of casing 2. In an actual implementation such a cement plug 6 may not be the only cement plug provided in the installation.

Figure 6:
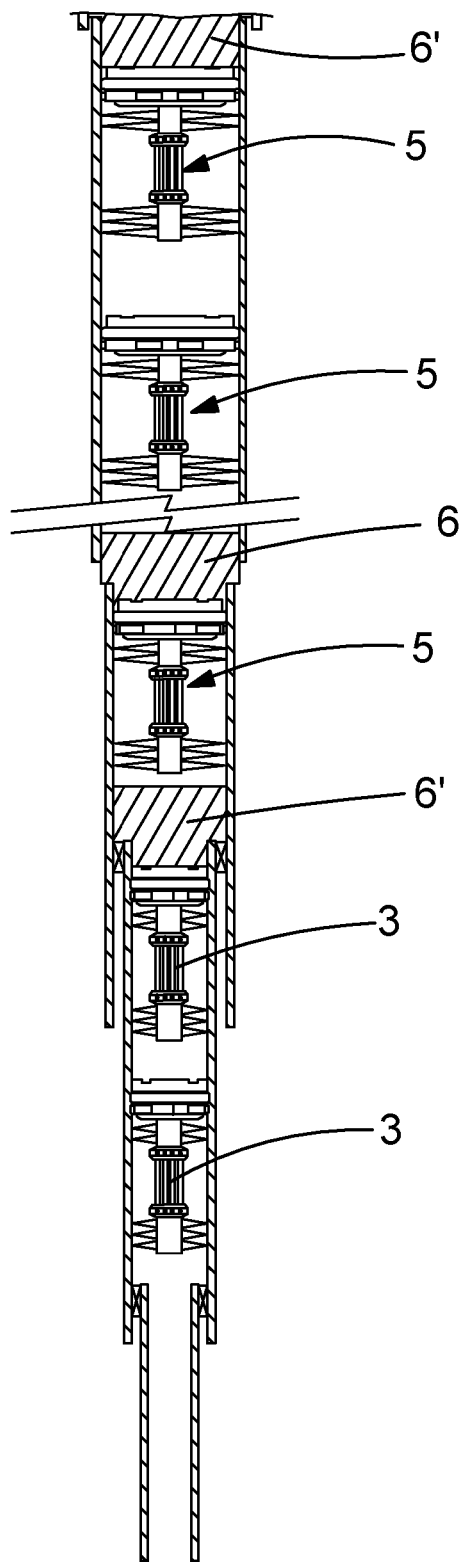
FIG. 6 shows a similar portion of a monitoring well installation including a fifth communication arrangement.

Such a particular installation is shown in FIG. 6.

Here as well as the main cement plug 6 provided at the location where there is an axial spacing in the casing 2A, further auxiliary cement plugs are provided. One auxiliary cement plug 6' is provided above the main cement plug 6 and one auxiliary cement plug 6' is provided below the main cement plug 6.

In an arrangement of the type shown in FIG. 6 any one or more of the different techniques described above in relation to FIGS. 1 to 5 or described below in relation to FIGS. 7 to 13 may be used for communicating across the main cement plug 6.

In the arrangement shown in FIG. 6 there are two downhole sensing tools 3 each for sensing at least one parameter at respective locations in the well. In other examples there may be further sensing tools provided at different locations within the well. In the present embodiment, both downhole sensing tools 3 are provided below the lower auxiliary cement plug 6'.

The arrangement of FIG. 6 also comprises three repeater communication units 5 as well as the downhole sensing tools 3 also being arranged as repeater units.

One of the repeater communication units 5—acting as across plug communication apparatus—is located between the lower auxiliary plug 6' and the main plug 6 whereas the other repeater units 5 are located above the main plug 6 but below the upper auxiliary plug 6'.

It will be noted that any number of repeaters 5 and sensing tools 3 may be provided in a particular well installation for particular purposes.

Further any one or more of the devices may be arranged to act as a sealing device (or component plug) for sealing the borehole at its location. Thus for example the lowermost sensing tool 3 may act as a component plug.

In the present embodiment the sensing tools 3 and repeater units 5 are all arranged for effecting EM communication between one another for extracting data from the two sensing tools 3 and passing this towards the surface. On the other hand the uppermost repeater communication unit 5 is arranged for transmitting acoustic signals above its location and for receiving acoustic signals from above its location. Thus whilst the lower part of the communication channel as shown in FIG. 6 relies on EM communication, at locations above this, acoustic communication is used. As such the upper repeater communication unit 5 might be termed an EM-acoustic bridge.

As will be appreciated, as well as using one of the different techniques described above in relation to FIGS. 3 to 5 or below in relation to FIGS. 7 to 13 for helping to enhance communication across the main plug 6, different communication techniques may be used for signalling along the whole signal channel in an installation of the type shown in FIG. 6. Thus acoustic, EM, cable, optical, or any other appropriate signalling techniques may be used in any or all legs of the signal channel.

This applies to signalling in both directions. Whilst the above description has been written primarily in terms of signalling from downhole towards the surface such that data may be extracted then, it should be noted that in any of the embodiments above, signalling may be operated in the opposite direction and, for example, control signals may be provided from the surface downwards to any of the components described.

The communication arrangement may be arranged to use one or more of a plurality of signalling techniques in either or both directions, for example, one or more of:

EM signals;
Acoustic signals;
Inductive signals;
Radio frequency signals;
Impedance modulations signals;
Optical signals;
Pressure pulse signals;
Hydraulic control line signals; and
Cable carried electrical signals.

The axial spacing 2A provided in the casing may have a range of different lengths in different implementations. In some cases the axial spacing may be in the order of 1 m. In other cases the axial spacing may be up to say 100 m or even many 100's m. Where the spacing is longer it will typically be more desirable to include inplug apparatus, such as an axially extending metallic member.

There will be an optimal spacing between the repeater communication unit 5 below the plug 6 and the gap 2A in the casing (or between the downhole communication unit 31 and the gap 2A in the casing where there is no repeater communication unit 5). This optimal spacing will be dependent on the length of the gap 2A. In general terms the optimal spacing will be proportionate to the length of the gap 2A. Thus installing a system may include a step of determining the spacing between the repeater communication unit 5 downhole communication unit 31 and the gap 2A in dependence on the length of the gap 2A.

Similarly where a repeater communication unit 5' is provided above the plug 6, there will be an optimal spacing between the unit 5' and the gap in the casing 2A. Again this will be proportionate to the length of the gap 2A and an installation method may include determining the spacing between the upper repeater communication unit 5' and the gap 2A in dependence on the length of the gap 2A. Modelling or analytical methods may be used in such a determination.

As the repeater 5, 5' to gap 2A spacing is increased you gain in terms of the length of casing available for coupling signals to/from the formation F but you lose in terms of moving the point of signal application/pick up further from the gap 2A.

The optimal spacing may be say 100 m with a 50-100 m gap 2A in the casing 2.

Figure 7:
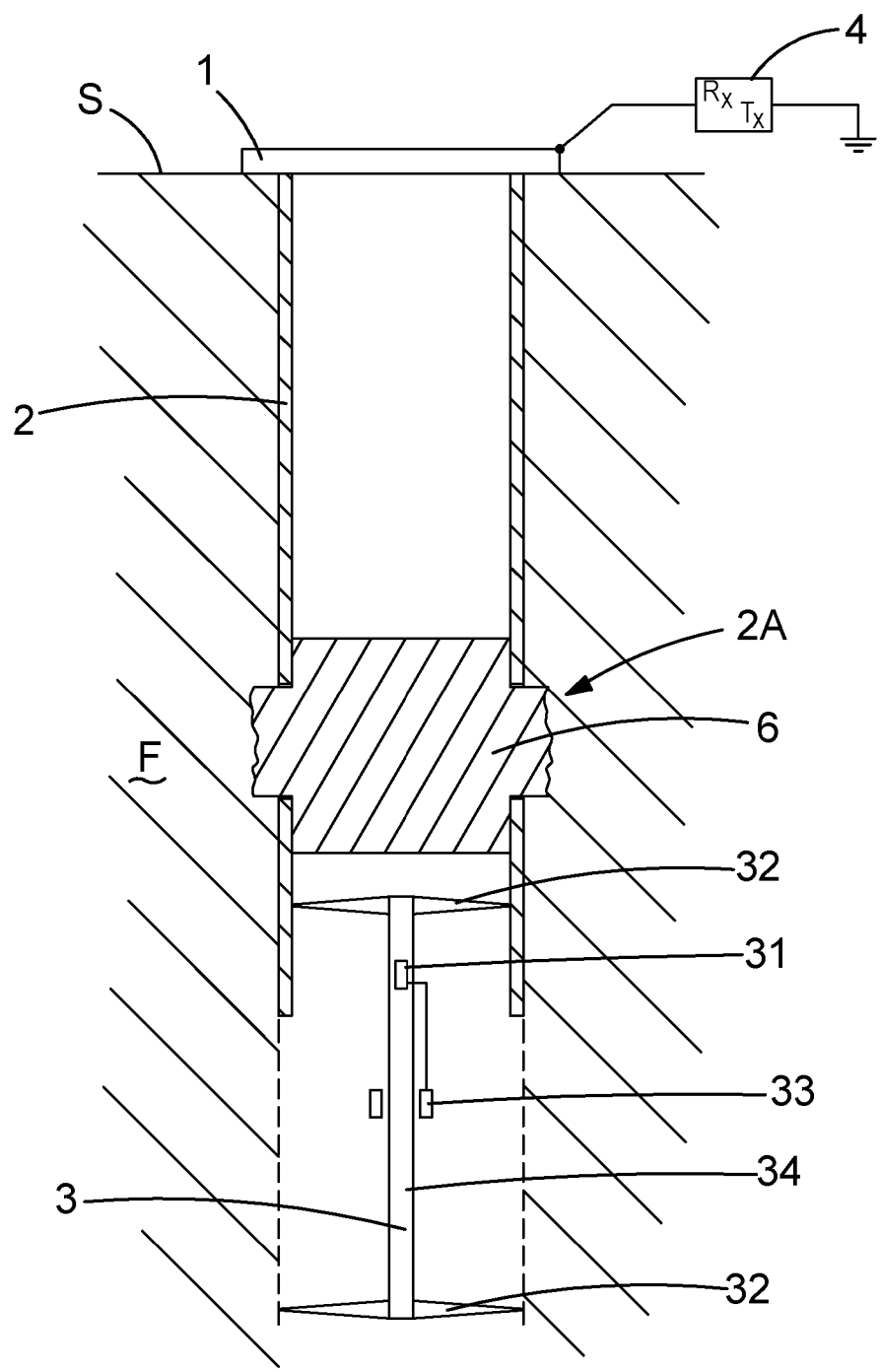
FIG. 7 shows an alternative well installation.

FIG. 7 shows a monitoring well installation which is similar to that shown in FIG. 1 and which may make use of the arrangements described in relation to FIGS. 2 to 5 or FIGS. 8 to 13 below for signalling across the plug 6. Components in common with FIG. 1 are given the same reference numerals and detailed description of those is omitted.

In this case the repeater communication unit of FIG. 1 is omitted. Rather the downhole sensing tool 3 is located in the region of the plug 6. Further the tool 3 extends beyond the casing 2 into open hole. This most typically will be an appropriate arrangement where the plug 6 is relatively deep in the well.

This arrangement is proposed partly on the basis that for the arrangement of FIG. 1 or 2 to function satisfactorily, a sufficient length of casing 2 is needed below the location of the downhole sensing tool 3–say 100 m. If the casing 2 is not available to this depth then the provision of a tool as shown in FIG. 7 which can extend a desired distance into open hole can provide a solution.

In this case whilst the upper conductive centraliser 32 contacts with the casing 2, the lower conductive centraliser 32 contacts with the formation F in open hole. Further the below plug communication unit 31 is arranged to apply (and pick up) signals via a toroid (inductive coupling) 33 provided around a conductive housing 34 of the downhole sensing tool 3. Typically the housing 34 may comprise downhole pipe, such as would be used as production tubing.

In an alternative a simple spaced contact approach might be used, but this would be less effective. In another alternative the below plug communication unit can be arranged to apply (and pick up) signals across an insulation joint (eg a gap sub) provided in the housing of the downhole sensing tool 3.

It will be appreciated that in principle there is no reason why the arrangement of the downhole sensing tool 3 in FIG. 7 should not also be used as a repeater, if there is need to pick up signal from some other more remote (say deeper) location.

Figure 8:
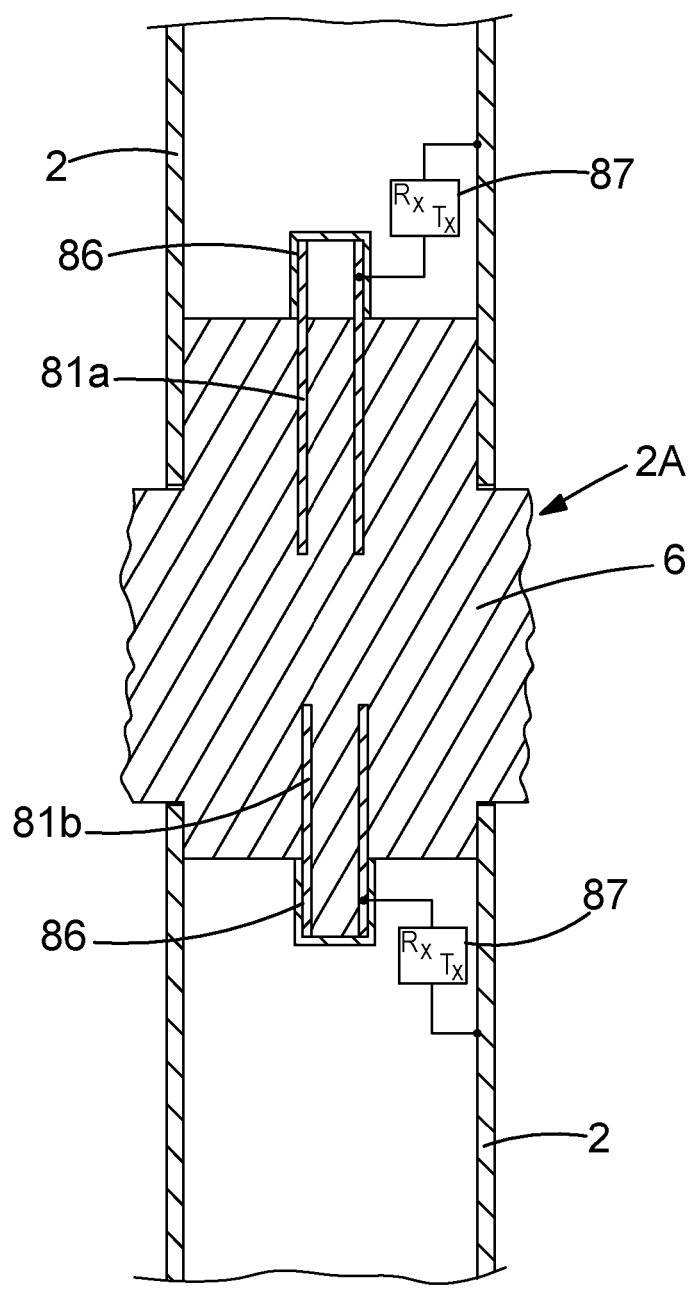
FIG. 8 shows a similar portion of a monitoring well installation as shown in FIG. 2 including a sixth communication arrangement.

FIG. 8 shows a further alternative communication arrangement which may be used in a well installation of the type shown in FIG. 1 or FIG. 7.

Here again inplug apparatus is provided. In this instance the inplug apparatus comprises a pair of axially extending metallic member 81a, 81b. Each is partly embedded in the material of the plug 6 and extends partly beyond the plug 6. The members 81a, 81b are axially spaced from one another and insulated from one another by the material of the plug 6—there is a region in the middle of the plug 6 through which the members 81a, 81b do not penetrate.

One of the members 81a projects from an upper end of the plug 6 and the other 81b projects from a lower end of the plug 6. The projecting ends are encased in insulating material 86. A first transceiver 87 is connected between the first axially extending member 81a and the casing 2 above the gap 2A. A second transceiver 87 is connected between the second axially extending member 81b and the casing 2 below the gap 2A.

In use high voltage electrical signals are applied by one of the transceivers 87 to the respective axially extending member 81a, 81b causing generation of electric field in the material of the plug 6. As a result electrical signals are induced in the other axially extending member 81a, 81b which can be picked up by the respective transceiver 87 such that data may be transmitted across the plug 6. The same mechanism may also be used in the opposite direction.

As will be appreciated again each axially extending metallic member may comprise a portion of downhole pipe as might be used as production tubing.

Figure 9:
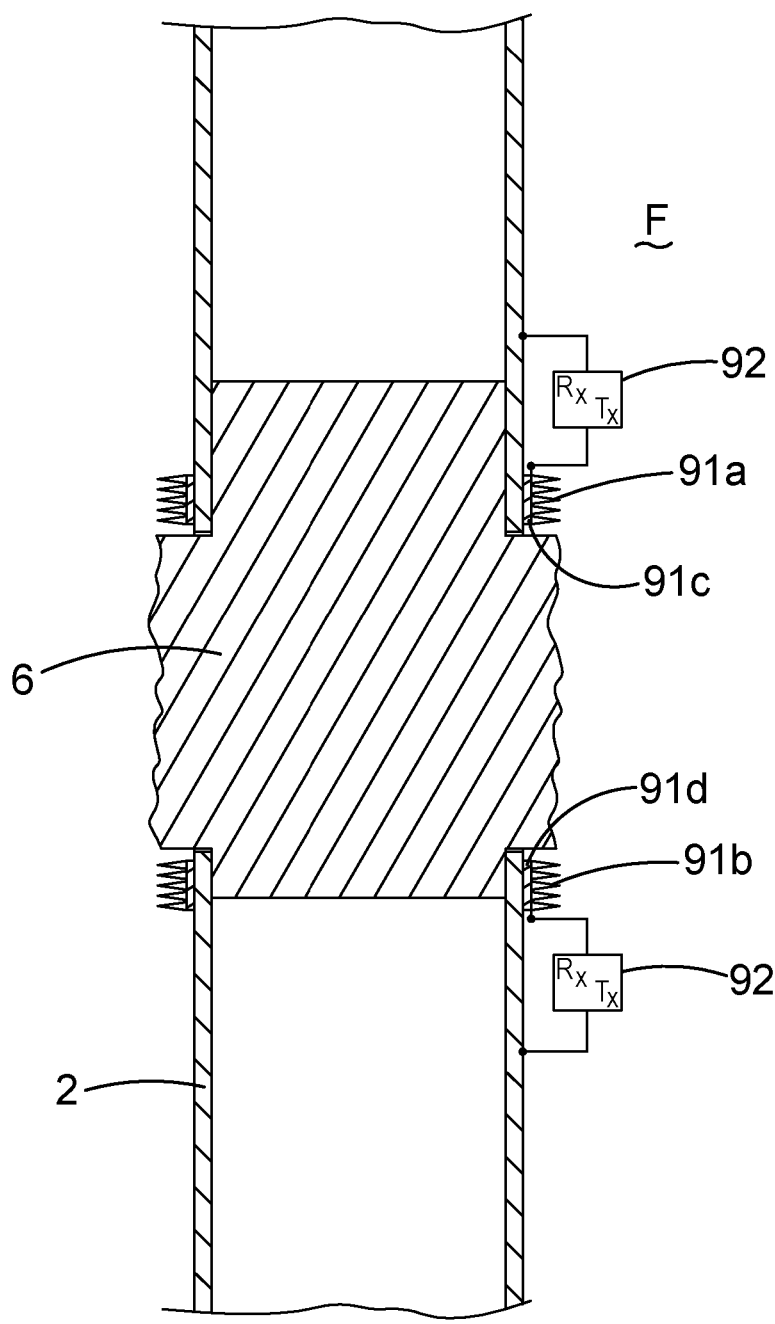
FIG. 9 shows a similar portion of a monitoring well installation as shown in FIG. 2 including a seventh communication arrangement.

FIG. 9 shows a further alternative communication arrangement which may be used in a well installation of the type shown in FIG. 1 of FIG. 7.

In this instance at least one electrode 91a is provided outside of the casing 2 and in electrical contact with the formation F above the location of the gap in the casing 2A and similarly at least one electrode 91b is provided outside of the casing 2 and in electrical contact with the formation F below the location of the gap in the casing 2A. The electrodes 91a, 91b are insulated from the casing 2 in their immediate location by respective insulating layers 91c, 91d. The electrodes 91a, 91b may be arranged to project into the formation to increase the effectiveness of electrical contact therebetween. The electrodes 91a, 91b may extend around the circumference of the casing.

In practice such electrodes will need to be installed when the casing 2 is installed in the well.

A first transceiver 92 is connected between the first electrode 91a and the casing 2 above the gap 2A. A second transceiver 92 is connected between the second electrode 91b and the casing 2 below the gap 2A.

In use electrical signals are applied by one of the transceivers 92 to the respective electrode 91a, 91b causing electrical signals in the formation F and/or the generation of electric field in the formation F. As a result electrical signals are induced in the other electrode 91a, 91b which can be picked up by the respective transceiver 92 such that data may be transmitted, via the formation F, across the plug 6. The same mechanism may also be used to signal in the opposite direction.

Figure 10:
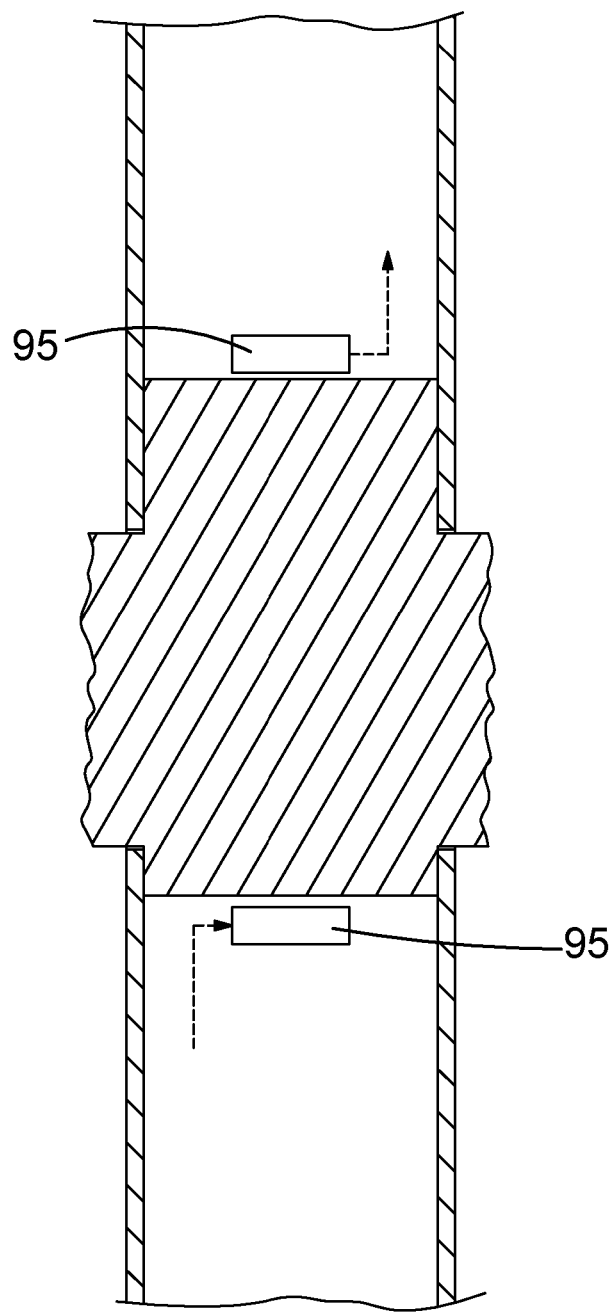
FIG. 10 shows a similar portion of a monitoring well installation as shown in FIG. 2 including an eighth communication arrangement.

FIG. 10 shows a further alternative communication arrangement which may be used in a well installation of the type shown in FIG. 1 or FIG. 7.

Here the communication arrangement comprises a transducer 95a provided adjacent a first end of the plug 6 and a detector 95b provided adjacent a second end of the plug 6. The transducer 95a is arranged to apply data carrying signals to the material of the plug 6 and the detector 95b is arranged to pick up said data carrying signals from the material of the plug 6.

The transducer 95a may be arranged to apply at least one of: EM signals; Acoustic signals; Inductive signals; Radio Frequency signals, and the detector 95b may be arranged to pick up the corresponding signals.

In one particular example the transducer 95a comprises magnetic field generating means and the detector 95b comprises a magnetic field sensing means.

In another particular example the transducer 95a comprises a hammer member for applying vibrational, acoustic, signals to the plug 6 and the detector 95b comprise an acoustic sensor.

The same or a different mechanism may also be used to signal in the opposite direction.

Further as will be appreciated, in each of the arrangements shown in FIGS. 8 to 10 signals may be transmitted towards and away from each transceiver/transducer/detector 87, 92, 95a, 95b in parts of the signal channel away from the plug 6 using any convenient communication method as part of the overall communication arrangement.

Figure 11:
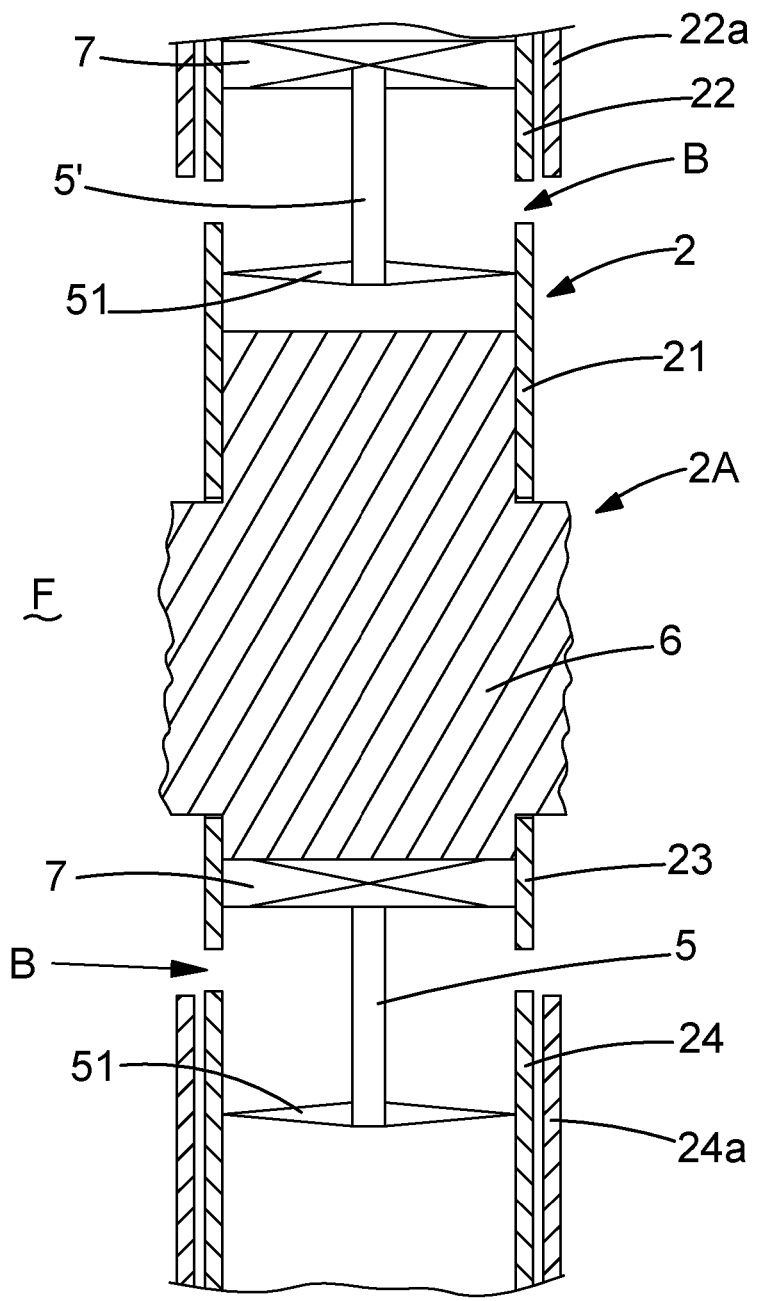
FIG. 11 shows a similar portion of a monitoring well installation as shown in FIG. 2 including a ninth communication arrangement and/or power delivery arrangement.

FIG. 11 shows a further alternative communication arrangement which may be used in a well installation of the type shown in FIG. 1 or FIG. 7. In this instance the arrangement is similar to that shown in FIG. 2 with a repeater communication unit 5 located in casing 2 below the plug 6 and a second repeater communication unit 5' located in the casing 2 above the location of the plug 6. Again each repeater unit 5, 5' is connected to the casing 2 via contacts 51, 7 which in this instance are embodied by a hanger 7 at the upper end of each repeater communication unit 5, 5' and a conductive centraliser 51 at the lower end of each repeater communication unit 5, 5'. Further each repeater communication unit 5, 5' is arranged for applying signals to and picking up signals from the casing making use of the spaced contacts.

However, in this communication arrangement additional breaks B are provided in the casing 2 above and below the plug 6. Thus, there is a first portion of the casing 21 located above the plug 6 which is not galvanically connected to the remainder of the casing 22 leading away from the plug 6.

Similarly in this embodiment below the plug there is a portion of casing 23 which is not galvanically connected to the remainder of the casing 24 leading away from the plug 6 further into the well.

In the present embodiment each of these breaks B in the casing 2 is in the form of an auxiliary axial spacing. These may be formed in the same way as or a different way to the main axial spacing 2A. In the present embodiment these auxiliary axial spacings are left open. This forms a fluid communication path from the interior of the casing to the annulus between the casing and the surrounding formation F. However, this can be tolerated because of the seal between the sealing material of the plug 6 and the formation at the main axial spacing 2A.

If desired either or both of the breaks B maybe filled with a suitable sealing material. In a further alternative, rather than an open axial spacing being provided at the breaks B an insulating section of casing might be introduced into the run of casing. It should be noted that here, at these breaks B, what is desired is providing a portion of casing 21, 23 which is isolated from the adjacent portions of casing 22, 24 as distinct from the main axial spacing 2A where exposing the formation F is an intrinsic part of forming the seal with the plug 6.

With the breaks B introduced into the runs of casing 2 then the respective isolated portions of casing 21, 23 can act as electrodes for allowing the application of signals to the formation F and the pickup of signals from the formation F. Furthermore each repeater communication unit 5, 5' is arranged to be connected between the respective isolated portion of casing 21, 23 and the respective remainder of the casing 22, 24 for the application and pickup of the signals.

That is to say each respective transmitter/transceiver/receiver is connected across the respective break B in the run of casing.

As will be appreciated this leads to a significant increase in efficiency compared with the situation, in say for example FIG. 2, where the application and pickup of signals relies on making spaced contacts to continuous lengths of casing.

Because of this increase in efficiency, the transfer of power across the plug using the arrangement of FIG. 11 becomes much more practical than with the arrangement of FIG. 2. Thus for example, the upper repeater unit 5' may be arranged for applying electrical power signals to the isolated portion of casing 21 which may then flow through the formation F surrounding the plug 6 and be picked up via the isolated casing portion 23 below the plug for use by say the repeater communication unit 5 located below the plug 6.

It will be appreciated that this arrangement shown in FIG. 11 for enhancing communication across the plug via electrical signals flowing in the formation around the plug maybe used in other situations than that specifically described in relation to FIG. 11. Thus for example, rather than a repeater communication unit 5 being located immediately below the plug as in FIG. 11, alternatively a sensing tool 3 may be provided in this location. Similarly another type of tool requiring power and/or communication can be located below the plug. Furthermore a different type of tool than the repeater communication unit 5 may be located above the plug 6 for applying signals and/or power via the isolated casing portion 21 for transmission to the tool located below the plug 6.

Further it will be appreciated that whilst the provision of a break B in the casing both above the plug 6 and below the plug 6 is most desirable (in terms of increase in efficiency of transmission), in at least some circumstances a break B in the casing might be provided only on one side of the plug. In such a case benefits can still be achieved.

In order to further enhance operation of the apparatus insulation 22a, 24a may be provided between said remainder of the casing portion 22, 24 leading away from the respective break B and the surrounding formation F.

This can help stop shorting currents flowing between the casing portions located immediately on either side of a break B. It is not desirable to provide insulation on the isolated portions 21, 23 since these are acting as electrodes.

In one particular example, the axial spacing 2A might have a length of, say, 50 meters and in such a case then having isolated portions of casing 21, 23 of in the order of 50 meters in length would be desirable. More generally it is desirable if the isolated portions of casing 21, 23 have substantially the same length as, or at least a similar length to, the axial length of the axial spacing 2A.

If there is a desire to transmit power across the plug 6 it is helpful if the axial spacing 2A as short as possible. For example in some cases an axial spacing 2A of, say, 3 meters may be sufficient for sealing purposes and in such a case the transmission of power becomes yet more feasible.

In one particular implementation of a tool of the type that may be used as, say, a repeater communication unit 5 as shown in, for example, FIG. 11, the tool may comprise a conductive housing. This housing may have a first end which is electrically connected the conductive centraliser 51 and a second end of which is connected to the hanger 7. Further the first end of the housing may be electrically insulated from the second end and an internal transmitter, transceiver and/or receiver may be connected between these first and second ends of the conductive housing for the application and/or pickup of signals via the conductive centraliser 51 and hanger 7.

Figure 12:
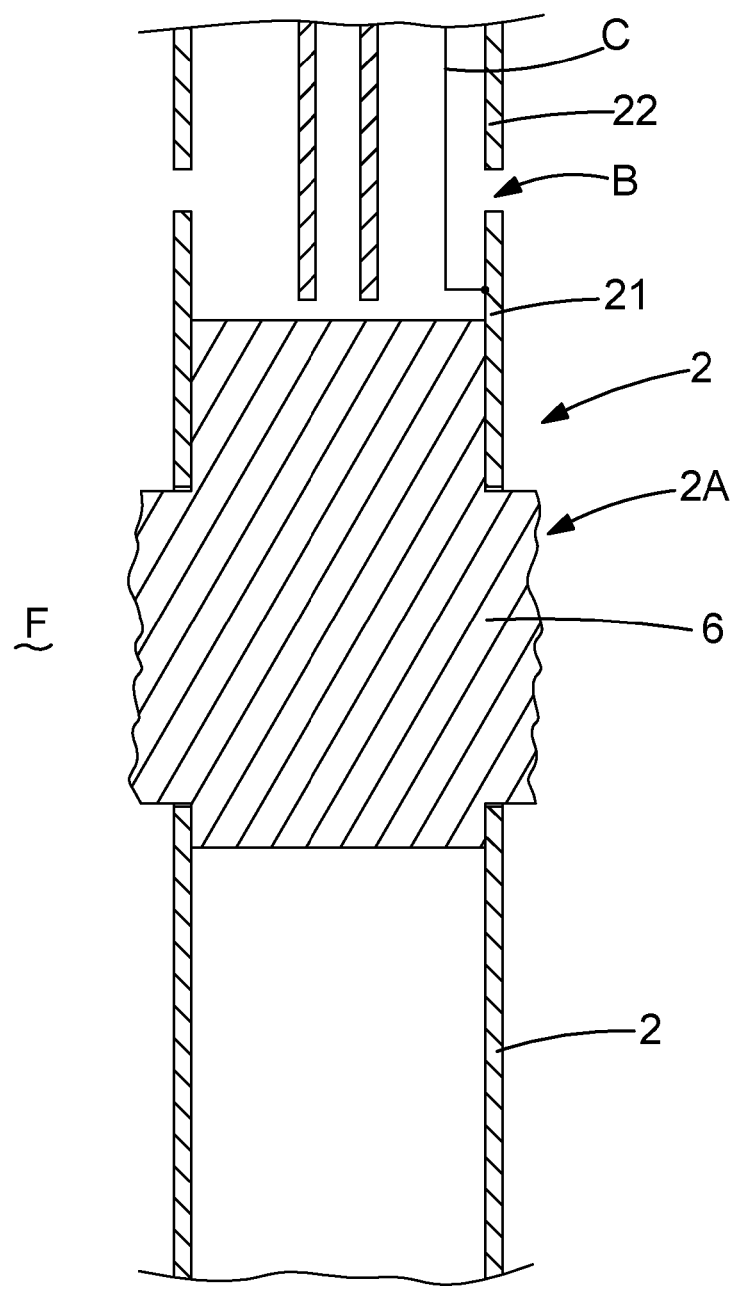
FIG. 12 shows a similar portion of a monitoring well installation as shown in FIG. 2 including a tenth communication arrangement and/or power delivery arrangement.

FIG. 12 shows a further alternative arrangement which may be used in the well installation of the type shown in FIG. 1 or FIG. 7. This arrangement makes use of similar ideas to those described above in relation to FIG. 11. Here again a break in the casing B is provided above the level of the plug 6. Here this is particularly with the view of allowing transmission of power across the plug. In this instance a cable C from a power source is connected to the isolated portion of the casing 21 which can act as an electrode for applying electrical power signals into the formation F which can be picked up via the casing 2 below the plug 6. Such power might be picked up by a tool of the type described above, for example a repeater communication unit or downhole sensing tool or so on.

If desired a further break B in the casing may be provided below the level of the plug 6 to help it pick up the power.

Figure 13:
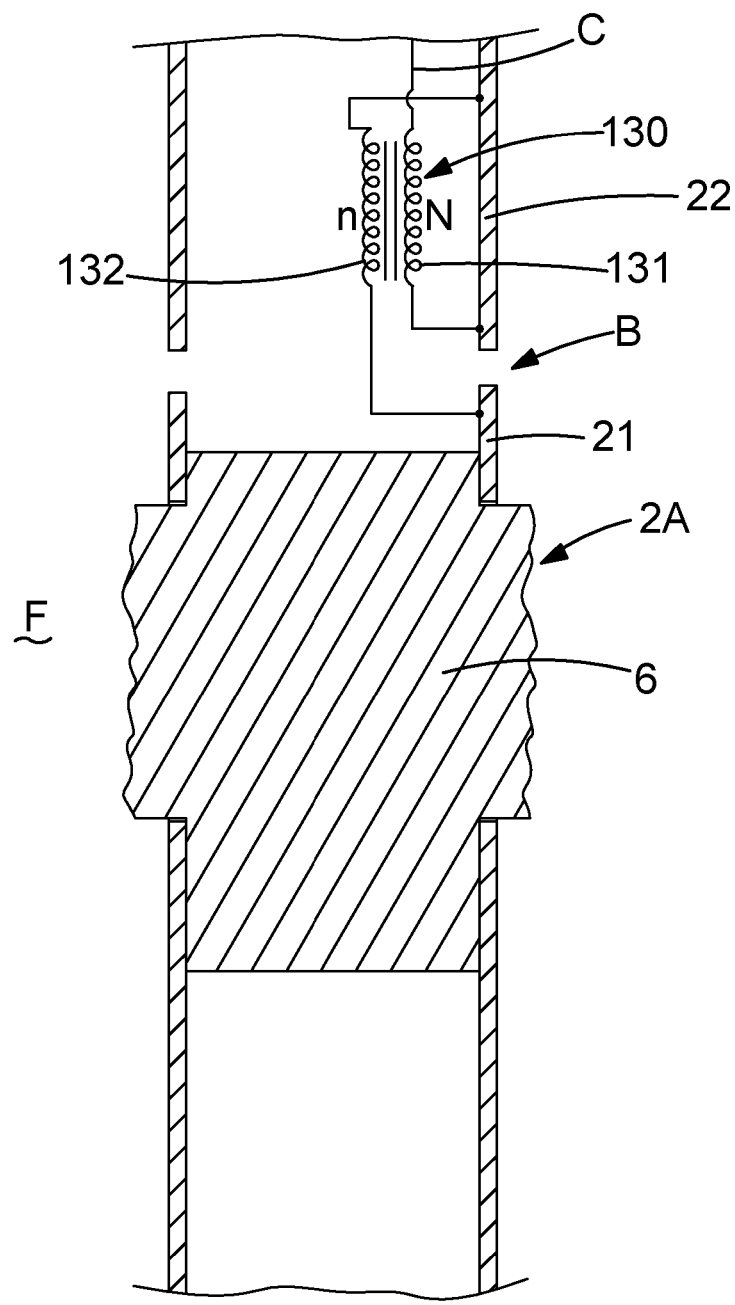
FIG. 13 shows a similar portion of a monitoring well installation as shown in FIG. 2 including an eleventh communication arrangement and/or power delivery arrangement.

FIG. 13 shows yet a further alternative arrangement which may be used in a well installation of the type shown in FIG. 1 or FIG. 7. This arrangement is similar to that shown in FIG. 12.

Here rather than a direct electrical connection between the cable C and the isolated casing portion 21, connection is effected via a transformer arrangement 130. The transformer arrangement 130 has a first winding 131 which is connected between the cable C from the power source on one hand and the portion of the casing 22 leading away from the break B and the axial spacing 2A on the other hand. The transformer arrangement 130 has a second winding 132 which is connected between the portion of the casing 22 leading away from the break B and the axial spacing 2A on the one hand and the isolated casing portion 21 on the other hand. Typically the first winding will have a different number of turns to the second winding. Generally the first winding will have a higher number of turns than the second winding to allow impedance matching between the cable C and the power source on the one hand and the electrode portion of the casing 21 on the other hand.

In operation power from the power source energises the first winding 31 which induces current in the second winding 132 which causes application of signals to the isolated casing portion 21 such that these may be transmitted into the formations F surrounding the plug 6 for pickup below the plug 6.

It will be appreciated that again a break B may be included in the casing below the plug 6 to assist power pickup below the plug.

Furthermore insulation of the type described and shown in relation to FIG. 11 may also be used in the case of the FIG. 12 and FIG. 13 arrangements.

Whilst the arrangements of FIGS. 12 and 13 are perhaps most useful for situations where the desire is to transmit power across the plug 6 they may also be used for transmitting data carrying signals across the plug. Similarly they may be used for the acquisition of data carrying signals being transmitted from below the plug 6 towards the surface.

The invention claimed is:

1. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, wherein a break is provided in the metallic casing on at least one side of the axial spacing so forming a casing section which is not galvanically connected to the remainder of the casing on the respective side of the axial spacing and the across plug communication apparatus comprises said casing section as an electrode for applying electrical signals to the formation and/or for picking up electrical signals from the formation.

2. A monitoring well installation according to claim 1 in which the communication arrangement comprises a below plug communication unit located below the plug for transmitting signals carrying data towards the surface.

3. A monitoring well installation according to claim 2 further comprising at least one repeater communication unit for receiving signals from the below plug communication unit and transmitting signals onwards towards the surface.

4. A monitoring well installation according to claim 1 in which the communication arrangement further comprises inplug apparatus located within the sealing material plug for assisting in communication across the plug.

5. A monitoring well installation according to claim 4 in which the inplug apparatus comprises an axially extending metallic member running within the sealing material plug.

6. A monitoring well installation according to claim 5 in which the axially extending metallic member acts as a leg of a communication channel across the axial spacing in the casing.

7. A monitoring well installation according to claim 5 in which the axially extending metallic member comprises a length of downhole pipe.

8. A monitoring well installation according to claim 5 in which the axially extending metallic member is electrically connected to a first casing portion on one side of the axial spacing via a conductive component embedded in the sealing material plug.

9. A monitoring well installation according to claim 8 in which the axially extending metallic member is electrically connected to a second casing portion on the other side of the axial spacing via a conductive component provided externally of the sealing material plug.

10. A monitoring well installation according to claim 5 in which the inplug apparatus comprises an axially extending metallic member provided in two sections which are electrically insulated from another and the inplug apparatus further comprises a communication repeater connected between the two sections for applying signals thereto and/or picking up signals therefrom.

11. A monitoring well installation according to claim 5 in which the inplug apparatus further comprises two axially extending metallic member portions which are spaced from one another and electrically insulated from another and which each have a first portion embedded in the sealing material plug and a second portion extending to the end of or beyond the end of the sealing material plug, with a first of the metallic member portions extending to or beyond a first end of the plug and a second of the metallic member portions extending to or beyond a second end of the plug and the communication arrangement further comprising a transmitter or transceiver for applying electrical signals to the first metallic member portion at a location towards the first end of the plug for causing generation of an electric field in the plug and a receiver or transceiver for picking up, from the second metallic member portion at a location towards the second end of the plug, electrical signals induced in the second metallic member portion by the electric field generated in the plug.

12. A monitoring well installation according to claim 4 in which the inplug apparatus comprises at least one repeater communication unit.

13. A monitoring well installation according to claim 4 in which the inplug apparatus comprises two communication repeaters electrically connected to one another via a length of cable.

14. A monitoring well installation according to claim 1 in which the communication arrangement comprises connection means for electrically connecting a casing portion below the axial spacing to a casing portion above the axial spacing.

15. A monitoring well installation according to claim 14 in which the connection means comprises the axially extending metallic member.

16. A monitoring well installation according to claim 1 in which the across plug communication apparatus comprises an electrode being provided outside of the casing in the region of the sealing material plug and insulated from the casing, and the across plug communication apparatus further comprising at least one of a transceiver, transmitter and receiver connected between the electrode on the one hand and an adjacent portion of the casing on the other hand.

17. A monitoring well installation according to claim 1 in which the across plug communication apparatus comprises a transducer provided adjacent a first end of the plug and a detector provided adjacent a second end of the plug, the transducer arranged to apply data carrying signals to the material of the plug and the detector arranged to pick up said data carrying signals from the material of the plug.

18. A monitoring well installation according to claim 1 in which at least one of a transceiver, transmitter and receiver is connected between said casing section and the remainder of the casing on the respective side of the axial spacing for applying and/or picking up electrical signals.

19. A monitoring well installation according to claim 1 in which a respective break in the metallic casing is provided on each side of the axial spacing.

20. A monitoring well installation according to claim 1 in which electrical power is transmitted across the plug.

21. A monitoring well installation according to claim 1 in which, insulation is provided between the casing and the formation in a region on the side of the break which leads away from the axial spacing.

22. A well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a downhole tool located below the plug requiring electrical power and across plug power delivery apparatus for delivering power to the tool across the plug, and wherein a break is provided in the metallic casing on at least one side of the axial spacing so forming a casing section which is not galvanically connected to the remainder of the casing on the respective side of the axial spacing and the power delivery apparatus comprises said casing section as an electrode for applying electrical power signals to the formation and/or for picking up electrical power signals from the formation.

23. A method of creating a monitoring well installation in a cased borehole comprising the steps of:
creating axial spacing between adjacent casing portions at an intended location for a sealing material plug which is to be provided downhole in the borehole for blocking the interior of the casing and sealing the borehole against the egress of fluid from a zone below the plug, the axial spacing of the casing portions being such that there is an uncased length of borehole in which the sealing material of the plug may seal against a formation in which the borehole is drilled;
installing a sensing tool below the intended location of the plug for sensing at least one parameter below the plug;
providing a communication arrangement for use in transmitting data from the sensing tool towards the surface wherein the communication arrangement comprises across plug communication apparatus for facilitating transmission of signals carrying data across the plug towards the surface; and
creating the sealing material plug at the downhole location,
wherein a break is provided in the metallic casing on at least one side of the axial spacing so forming a casing section which is not galvanically connected to the remainder of the casing on the respective side of the axial spacing and the across plug communication apparatus comprises said casing section as an electrode for applying electrical signals to the formation and/or for picking up electrical signals from the formation.

24. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface,
wherein the communication arrangement comprises inplug apparatus located within the sealing material plug for assisting in communication across the plug, wherein the inplug apparatus comprises an axially extending metallic member running within the sealing material plug, and wherein the axially extending metallic member comprises a length of downhole pipe.

25. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, wherein the communication arrangement comprises inplug apparatus located within the sealing material plug for assisting in communication across the plug, wherein the inplug apparatus comprises an axially extending metallic member running within the sealing material plug, and wherein the axially extending metallic member is electrically connected to a first casing portion on one side of the axial spacing via a conductive component embedded in the sealing material plug.

26. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, wherein the communication arrangement comprises connection means for electrically connecting a casing portion below the axial spacing to a casing portion above the axial spacing.

27. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, wherein the communication arrangement comprises inplug apparatus located within the sealing material plug for assisting in communication across the plug, wherein the inplug apparatus comprises an axially extending metallic member running within the sealing material plug, and wherein the inplug apparatus further comprises an axially extending metallic member provided in two sections which are electrically insulated from another and the inplug apparatus further comprises a communication repeater connected between the two sections for applying signals thereto and/or picking up signals therefrom.

28. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, wherein the communication arrangement comprises inplug apparatus located within the sealing material plug for assisting in communication across the plug, wherein the inplug apparatus comprises an axially extending metallic member running within the sealing material plug, and wherein the inplug apparatus further comprises two axially extending metallic member portions which are spaced from one another and electrically insulated from another and which each have a first portion embedded in the sealing material plug and a second portion extending to the end of or beyond the end of the sealing material plug, with a first of the metallic member portions extending to or beyond a first end of the plug and a second of the metallic member portions extending to or beyond a second end of the plug and the communication arrangement further comprising a transmitter or transceiver for applying electrical signals to the first metallic member portion at a location towards the first end of the plug for causing generation of an electric field in the plug and a receiver or transceiver for picking up, from the second metallic member portion at a location towards the second end of the plug, electrical signals induced in the second metallic member portion by the electric field generated in the plug.

29. A monitoring well installation comprising metallic casing running down from the surface into a borehole and a sealing material plug provided downhole in the borehole for blocking the interior of the casing and sealing the borehole against the egress of fluid from a zone below the plug, wherein there is an axial spacing between adjacent casing portions in the region of the plug such that there is an uncased length of borehole in which the material of the plug seals against a formation in which the borehole is drilled, and wherein there is provided a sensing tool located below the plug for sensing at least one parameter below the plug and a communication arrangement for use in transmitting data from the sensing tool towards the surface, wherein the communication arrangement comprises across plug communication apparatus for facilitating transmission of signals carrying data across the plug towards the surface, and wherein the across plug communication apparatus comprises at least one electrode for applying electrical signals to the formation and/or picking up electrical signals from the formation, the electrode being provided outside of the casing in the region of the sealing material plug and insulated from the casing, and the across plug communication apparatus further comprising at least one of a transceiver, transmitter and receiver connected between the electrode on the one hand and an adjacent portion of the casing on the other hand.

\* \* \* \* \*